(12) United States Patent
Chu et al.

(10) Patent No.: US 10,940,577 B2
(45) Date of Patent: Mar. 9, 2021

(54) TORQUE CONTROL SYSTEM AND TORQUE CONTROL METHOD FOR POWER IMPACT TORQUE TOOL

(71) Applicant: CHINA PNEUMATIC CORPORATION, Taoyuan (TW)

(72) Inventors: Yu-Wei Chu, Taoyuan (TW); Tai-Yun Chiang, Taoyuan (TW)

(73) Assignee: CHINA PNEUMATIC CORPORATION, Taoyuan (TW)

( * ) Notice: Subject to any disclaimer, the term of this patent is extended or adjusted under 35 U.S.C. 154(b) by 418 days.

(21) Appl. No.: 15/653,634

(22) Filed: Jul. 19, 2017

(65) Prior Publication Data

US 2019/0022836 A1 Jan. 24, 2019

(51) Int. Cl.
  *B25B 23/147* (2006.01)
  *B25B 21/02* (2006.01)
  *G01L 25/00* (2006.01)

(52) U.S. Cl.
  CPC .......... *B25B 23/1475* (2013.01); *B25B 21/02* (2013.01); *G01L 25/003* (2013.01)

(58) Field of Classification Search
  CPC .... B25B 21/02; B25B 23/1475; G01L 25/003
  See application file for complete search history.

(56) References Cited

U.S. PATENT DOCUMENTS 9,321,159 B2 * 4/2016 May ................... B25B 23/1456
9,427,852 B2 * 8/2016 Mizuno .............. B25B 23/1405
9,687,972 B2 * 6/2017 Sekino ................ B25B 23/1405
2004/0177704 A1 * 9/2004 Wagner ................ B25B 21/005
  73/862.21
2004/0182587 A1 * 9/2004 May .................... B25B 23/1405
  173/2

(Continued)

FOREIGN PATENT DOCUMENTS

CN   102706503 A  * 10/2012 ............... G01L 5/24
CN   102706503 A    10/2012

(Continued)

*Primary Examiner* — Thanh K Truong
*Assistant Examiner* — David G Shutty
(74) *Attorney, Agent, or Firm* — Schmeiser, Olsen & Watts, LLP

(57) ABSTRACT

In a torque control system and method for power impact torque tool, first establish a curve showing the relationship between the high/low working voltages of the tool in normal operation and the high/low torque values that are correspondingly output by the tool at the high/low working voltages. Input a target torque value that falls between the highest and the lowest torque value on the relationship curve to obtain a working voltage corresponding to the target torque value for performing a tightening operation. During the tightening process, a microprocessor of a torque control device receives and uses sensing signals instantly and continuously sent by a torque sensing device and changes in voltage, current and motor temperature continuously detected by a voltage/current sensing element and a temperature sensing element to stably control, via a voltage control module, the working voltage within a preset allowable range of variation for tightening torque control.

2 Claims, 18 Drawing Sheets

(56) References Cited

U.S. PATENT DOCUMENTS

| | | | | |
|---|---|---|---|---|
| 2007/0103104 | A1* | 5/2007 | May | B25B 23/1405 318/432 |
| 2009/0302794 | A1* | 12/2009 | Wei | H02P 7/295 318/432 |
| 2009/0302798 | A1* | 12/2009 | Wei | H02P 7/295 318/689 |
| 2010/0192705 | A1* | 8/2010 | Chu | B25B 23/14 73/862.338 |
| 2010/0265097 | A1* | 10/2010 | Obatake | B25B 21/00 340/870.4 |
| 2010/0307782 | A1* | 12/2010 | Iwata | B25F 5/00 173/1 |
| 2012/0191378 | A1* | 7/2012 | Chu | G01L 25/003 702/41 |
| 2014/0042951 | A1* | 2/2014 | Chen | H02P 23/14 318/689 |
| 2015/0021062 | A1* | 1/2015 | Sekino | B25B 23/1453 173/183 |
| 2015/0041162 | A1* | 2/2015 | Chu | G05D 17/00 173/1 |
| 2017/0262002 | A1* | 9/2017 | Chu | G05D 17/02 |

FOREIGN PATENT DOCUMENTS

| | | | | |
|---|---|---|---|---|
| DE | 2735594 A1 | 3/1978 | | |
| TW | 201131995 A1 | 9/2011 | | |
| TW | 201406506 A | 2/2014 | | |
| TW | M492454 U | 12/2014 | | |
| TW | 201604669 A | * | 2/2016 | G05D 17/00 |
| TW | 201604669 A | | 2/2016 | |
| TW | M550202 U | 10/2017 | | |
| WO | WO-2016015175 A1 | * | 2/2015 | G05D 17/02 |
| WO | WO 2016/015175 | * | 2/2016 | B25B 23/145 |
| WO | WO 2016015175 A1 | * | 2/2016 | B23P 19/06 |

* cited by examiner

Connect a power supply module to the power impact torque tool, and use a torque control device built in or externally connected to the tool to detect a highest voltage and a lowest voltage of the tool in normal operation at its existing output capacity. —S11

Drive the tool and a torque sensing device built in or externally connected to an output end of the tool to perform a torque calibration operation, and establish a relationship curve of the highest/lowest voltages of the tool in normal operation and the corresponding highest/lowest torques. —S12

Enter a target torque value that falls between the highest and the lowest torque value shown in the relationship curve, use a microprocessor of the torque control device to amplify and compute the entered target torque value and compare the entered torque value with the relationship curve that has been previously stored in a memory unit, so as to obtain a working voltage corresponding to the target torque value for driving the power impact torque tool to perform a locking operation. —S13

During the locking process, use sensing signals immediately and continuously sent by the torque sensor device to the torque control device to perform the locking operation under closed-loop torque control, and the microprocessor uses changes in voltage, current and motor temperature continuously detected by a voltage/current sensor element and a temperature sensing element of the torque control device to stably control, via a voltage control module, the working voltage to be within a preset allowable range of variation so as to achieve the purpose of locking torque control, and finally, cut off power supply and emit a warning when a range of the target torque value is reached. —S14

FIG.5

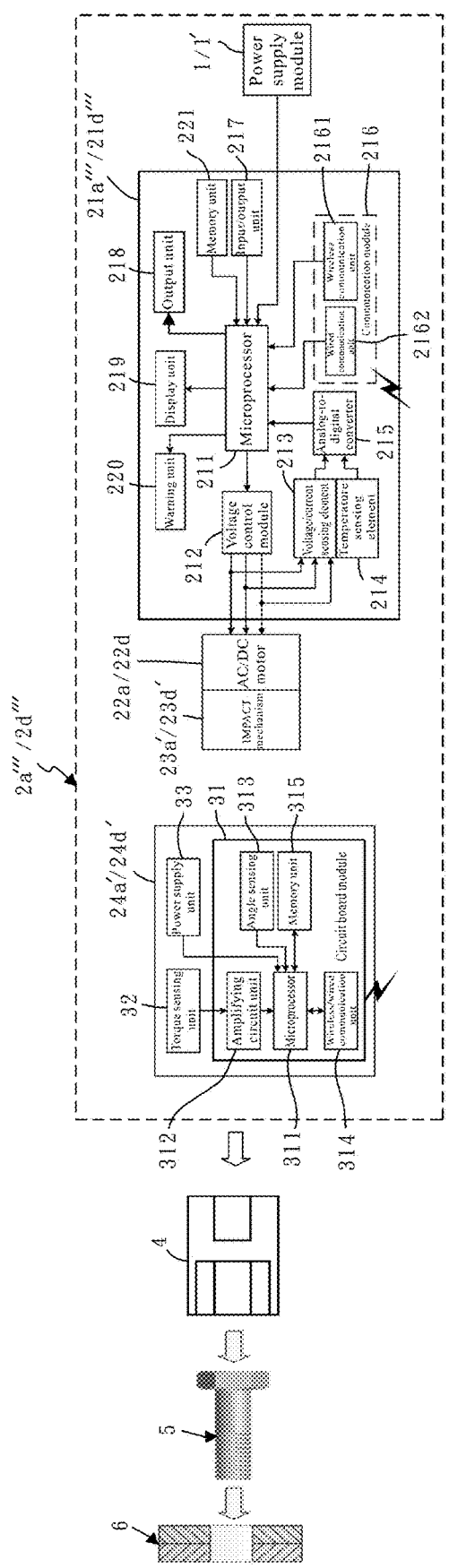
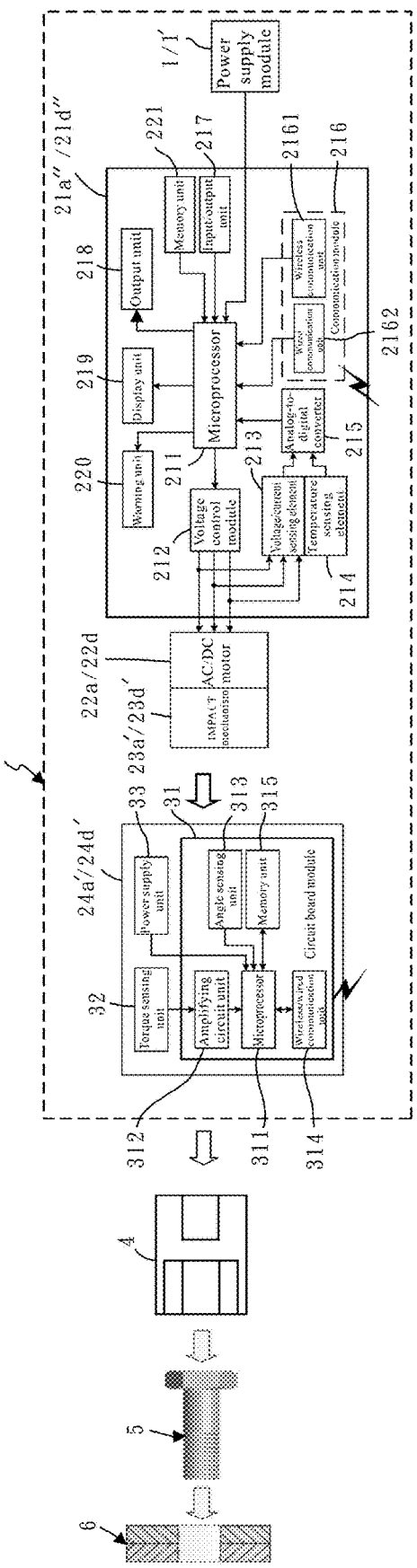
FIG.6A
FIG.6B

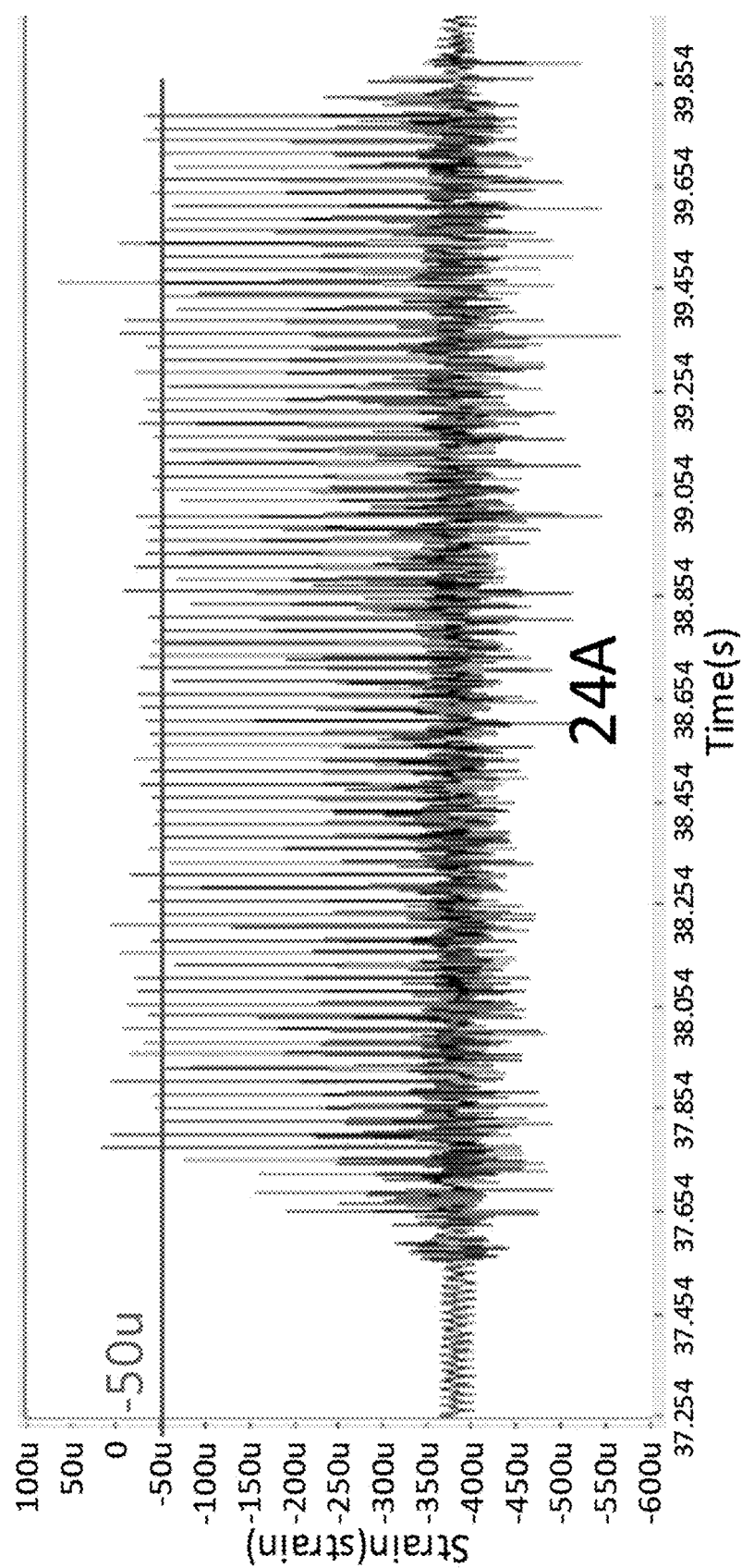

TORQUE CONTROL SYSTEM AND TORQUE CONTROL METHOD FOR POWER IMPACT TORQUE TOOL

FIELD OF THE INVENTION

The present invention relates to a torque control system for power impact torque tool, and more particularly to a torque control system in which alternating/direct current (AC/DC) is supplied to a brush or a brushless motor via a torque control device to drive a power impact torque wrench and a torque sensing device connected to an output end thereof, so as to control a torque output by the power impact torque wrench for tightening a bolt to a workpiece. The present invention also relates to a torque control method for power impact torque tool.

BACKGROUND OF THE INVENTION

There are various torque control devices and methods for power impact torque tools. For AC/DC motors, torque, position and speed or acceleration are generally the most common items that require control. To control these items, adjustments must be made by a controller using signals fed back thereto by a sensor. An electric motor is a mechanism that employs mechatronics to convert input electrical energy into mechanical energy and outputs the latter. Therefore, electrical energy control is important for the electric motor. However, concerning electrical energy control, only three factors can be really adjusted, namely, voltage, current direction and frequency. Among these three factors, the current direction controls the forward/reverse rotation of motor and is a relatively simple factor, the frequency is mainly related to the control of an induction motor, and the voltage is, however, the real factor that has close relation to the real targets to be controlled, such as the torque, position, speed and/or acceleration of the motor. That is, the voltage is the main parameter need to be adjusted by a controller for torque control.

Please refer to FIGS. 1A-1D, which illustrates conventional AC/DC motor-driven power impact wrenches with/without a built-in torque sensing device. In FIG. 1A, there is shown a battery-powered impact wrench 2d, which includes a control circuit board 21d, a DC motor 22d and an impact mechanism 23d mounted in a housing thereof and is electrically connected to a charging battery 1. FIG. 1B shows a battery-powered impact wrench 2d' with built-in torque sensing device. That is, the battery-powered impact wrench 2d' is formed by providing a torque sensing device 24d in the housing of the battery-powered impact wrench 2d of FIG. 1A between an impact mechanism 23d' and an output end 25 thereof. The battery-powered impact wrench 2d' has a control circuit board 21d' that drives a DC motor 22d and an impact mechanism 23d' to apply a torque via an output end 25' thereof to a bolt socket and a bolt, which is corresponding to the bolt socket in size and type, for tightening a workpiece. FIG. 1C shows mains-powered impact wrench 2a, which includes a control circuit board 21a, an AC motor 22a and an impact mechanism 23a mounted in a housing thereof and is electrically connected to an AC power source 1'. FIG. 1D shows a mains-powered impact wrench 2a' with built-in torque sensing device. That is, the mains-powered impact wrench 2a' is formed by providing a torque sensing device 24a in the housing of the mains-powered impact wrench 2a of FIG. 1C between an impact mechanism 23a' and an output end 25' thereof for driving a bolt socket and a bolt, which is corresponding to the bolt socket in size and type, for tightening a workpiece. The battery-powered impact wrench 2d and the mains-powered impact wrench 2a use the voltage to control the torque and use the current control to switch between forward and reverse rotation under open-loop control. However, these controls are almost useless in terms of the control of the magnitude of torque at the output end of the impact mechanism. On the other hand, with the battery-powered impact wrench 2d' and the mains-powered impact wrench 2a', the built-in torque sensing device 24d, 24a transmits torque or angle signals to the control circuit board 21d', 21a' in a wired or a wireless manner during the tightening process for a closed-loop control, which enables a somewhat significant improvement in the torque control at the output end of the impact mechanism.

When using any of the conventional power impact torque tools of FIGS. 1A-1D, the impact mechanism mounted to the output end of the motor impacts the output shaft of the tool to drive the bolt socket to tighten the bolt against the workpiece. Normally, the tightening torque is controlled only by adjusting the motor output voltage or the tension of the spring that pushes against the clutch. In some cases, a torque sensing device is mounted to a front end of the tool's output shaft to detect changes in the torque and the tightening angle. However, even though the same output voltage can be set, and the deformation of the bolt after tightening and the angle of rotation can be monitored in the process of turning the output shaft, or even different parameters, such as the duration of tightening time, can be set for torque control, there are still other factors that will lead to failure in stable tightening torque control. These factors include, for example, the inevitable gradual loss of the tool's power output ability during the process of use; the easy wearing of the impact mechanism of the impact torque tool; or in the case of an oil-pulse torque tool, the declination of the initially set torque caused by the rising temperature of the oil in the hydraulic cylinder due to continuous operation of the tool over a period of time; the use of the same torque setting to tighten workpieces of different joint hardness; and even the changing postures of a tired operator in handling the tool after having been working over a long time. When the above situations occur, the conventional power impact torque tools or the oil-pulse torque tools can only emit a warning to remind the operator of the detected result without the ability to solve the above problems and make any effective torque control.

It is therefore an object of the present invention to develop a torque control system and a torque control method for a power impact torque tool, so that sensing signals can be continuously transmitted to a torque control device built in or externally connected to the power impact torque tool during the whole operating process, and a microprocessor can use changes in voltage/current instantly and continuously detected by a voltage/current sensing element to stably control, via a voltage control module, the working voltage/current within a preset allowable range of variation to achieve the purpose of tightening torque control.

SUMMARY OF THE INVENTION

To achieve the above and other objects, the torque control method for power impact torque tool provided according to the present invention is to be applied to a tightening operation performed using a power impact torque tool or an oil-pulse torque tool and includes the following steps of connecting a power supply module to a torque control device built in or externally connected to an input end of the power impact torque tool to output a stable working voltage for driving the power impact torque tool and a torque sensing device built in or externally connected to an output end of the power torque tool; driving the power impact torque tool and the torque sensing device using a highest working voltage and a lowest working voltage of the power impact torque tool under normal operation, so as to perform a tightening torque calibration operation before the tightening operation starts; establishing a correspondence relationship curve of voltage and torque using the highest and lowest working voltages and the corresponding highest and lowest torque values obtained from the calibration operation; based on the correspondence relationship curve of voltage and torque, inputting a target torque value that falls between the highest torque value and the lowest torque value to obtain a corresponding working voltage; using the obtained corresponding working voltage to drive the power impact torque tool and the built-in or the externally connected torque sensing device to perform the tightening operation; and, during the tightening process, causing a microprocessor of the torque control device to amplify and compute sensing signals instantly and continuously sent by the torque sensing device to the torque control device and to compare the amplified and computed sensing signals with a relationship curve of voltage and torque that is pre-stored in a memory unit of the torque control device, so as to obtain a corresponding working voltage for performing the tightening operation under closed-loop torque control; based on changes in voltage, current and temperature instantly and continuously detected by a voltage/current sensing element and a temperature sensing element of the torque control device, the microprocessor stably controlling, via a voltage control module, the working voltage within a preset allowable range of variation to control the tightening torque; and finally, cutting off the power supply module and emitting a warning when the range of the target torque value is reached.

According to the above torque control method for power impact torque tool, the tightening torque calibration operation further includes the following steps of using the power impact torque tool to drive the torque sensing device; during the tightening process in the tightening torque calibration operation, using the torque control device to capture voltage signals detected by the voltage/current sensing element and torque signals detected by the torque sensing device; storing the captured voltage signals and torque signals in the memory unit of the torque control device; and performing multiple groups of torque calibration operations at multiple points between the highest and the lowest voltage and obtaining average sampling data thereof for establishing the correspondence relationship curve of voltage and torque, which indicates the voltages and the corresponding torque values of the power impact torque tool in normal operation.

The above torque control method for power impact torque tool further includes the following steps of using the power impact torque tool to directly tighten a workpiece and then using a torque calibrating tool to obtain a torque value used to tighten or untighten the workpiece; inputting the torque value to the torque control device via a keyboard; storing the input torque value and the changes in voltage and current captured by the voltage/current sensing element of the torque control device during the whole tightening operation in the memory unit of the torque control device; and performing multiple groups of torque calibration operations at multiple points between the highest and the lowest voltage and obtaining average sampling data thereof for establishing the correspondence relationship curve of voltage and torque, which indicates the voltages and the corresponding torque values of the power impact torque tool in normal operation.

The above torque control method for power impact torque tool further includes the following steps of automatically repeating the tightening torque calibration operation multiple times at multiple points between the highest and the lowest voltage in accordance with a preset program to obtain multiple groups of highest/lowest working voltages and their corresponding highest/lowest torque values; summarizing and averaging the multiple groups of highest torque values, lowest torque values, highest working voltages and lowest working voltages, respectively; and establishing the correspondence relationship curve of voltage and torque using the obtained average highest torque value, average lowest torque value, average highest working voltage and average lowest working voltage.

The above torque control method for power impact torque tool further includes the following steps of pushing a torque modification key when a relatively big difference exists between an actual torque value and the target torque value; the microprocessor automatically adjusting the correspondence relationship curve of voltage and torque based on the modified torque value and displaying an adjusted controllable range of torque; inputting the target torque value again to obtain, according to the adjusted relationship curve of torque and working voltage, an adjusted working voltage that is corresponding to the target torque value; and using the adjusted working voltage to drive the power impact torque tool, so that the tool can perform the tightening operation with the output torque reaching the target torque value.

The above torque control method for power impact torque tool further includes the following steps of inputting a calibrated torque value to replace the displayed torque value; using the substitute torque value to replace the torque value initially shown in the correspondence relationship curve of voltage and torque while the working voltage corresponding to the initially displayed torque value is unchanged; inputting the target torque value again; and, based on the adjusted relationship curve of torque and working voltage, driving the power impact torque tool with the working voltage, so that the tool can perform the tightening operation with the required target torque value.

The above torque control method for power impact torque tool further includes the following steps of, in the case a calibrated torque value does not match the target torque value but there is shown stable reproducibility in torque control, modifying only the torque value of the relationship curve while keeping the curve unchanged; monitoring and controlling changes in voltage during the whole tightening process or torque calibration; and emitting a warning via a warning device or cutting off the power source to the power impact torque tool when a change of the voltage falls out of the allowable range of variation.

To achieve the above and other objects, the torque control system for power impact torque tool provided according to the present invention includes a power supply module and a torque control device electrically connected to the power supply module for driving a power impact torque tool and a torque sensing device built in or externally connected to an output end of the power torque tool to perform a tightening operation. The torque control device includes a microprocessor, a voltage control module, a voltage/current sensing element, a temperature sensing element, an input and an output unit, a display unit, a warning unit, a wired/wireless communication module and a memory unit. The microprocessor amplifies and computes torque and angle sensing signals instantly and continuously emitted by the torque sensing device to the torque control device; compares the amplified and computed sensing signals with a relationship curve of voltage and torque stored in the memory unit to obtain a working voltage corresponding to a target torque value for performing the tightening operation under closed-loop torque control; the microprocessor stably controls, via the voltage control module, the working voltage within a preset allowable range of variation for tightening torque control by using changes in voltage, current and temperature instantly and continuously detected by the voltage/current sensing element and the temperature sensing unit during the tightening process; and cuts off the power supply module and emits a warning when the range of the target torque value is reached. The voltage control module stably controls the working voltage within a preset allowable range of variation for tightening torque control based on changes in voltage, current and temperature that are instantly and continuously detected by the voltage/current sensing element and the temperature sensing unit during the tightening operation. The voltage/current sensing element detects changes in the working voltage and working current of the power impact torque tool during the tightening operation and timely feeds the detected changes back to the microprocessor for use as a reference in voltage or current control. The temperature sensing element detects motor temperature rising and timely feeds the detected temperature rising back to the microprocessor for use as a reference in voltage or current control. The input/output units are used to transmit various torque settings in the torque control system, values of sensed deformation, target torque values and signals in connection with torque control. The display unit displays units of voltage and torque, target torque values and corresponding working voltages, number of tightening operations having been performed, and conditions of the tightening operations. The warning unit gives warnings by light indicators or sounds to remind a user of any result of the computation and determination made by the microprocessor. The wired/wireless communication module enables data communication between the torque control device and the torque sensing device in a wired or a wireless manner. The memory unit stores a highest torque value and a lowest torque value that are respectively corresponding to a highest working voltage and a lowest working voltage used in a tightening torque calibration operation performed for the power impact torque tool; and the memory unit also stores other related conditions of operation. The torque sensing device is built in the power impact torque tool or externally connected to an output end of the power impact torque tool and includes a torque sensing unit and a circuit board module electrically connected to a battery unit. The circuit board module further includes a microprocessor, an amplifying circuit unit, an angle sensing unit, a memory unit, an input/output unit, a charging circuit unit and a communication unit.

In another embodiment of the above torque control system for power impact torque tool, the voltage control module is replaced by a current control module. In this case, the torque control device drives the power impact torque tool and the torque sensing device using a highest working current and a lowest working current of the power impact torque tool in normal operation, so as to perform a tightening torque calibration operation before the tightening operation starts. The current control module also establishes a correspondence relationship curve of current and torque using the highest and lowest working currents and the corresponding highest and lowest torque values obtained from the calibration operation. Based on the correspondence relationship curve of current and torque, a target torque value that falls between the highest torque value and the lowest torque value can be input to obtain a corresponding working current. The torque control device uses the obtained corresponding working current to drive the power impact torque tool and the built-in or the externally connected torque sensing device to perform the tightening operation. In the tightening process, the microprocessor of the torque control device amplifies and computes sensing signals instantly and continuously sent by the torque sensing device to the torque control device and compares the amplified and computed sensing signals with the relationship curve pre-stored in the memory unit of the torque control device, so as to obtain a corresponding working current for performing the tightening operation under closed-loop torque control. Based on changes in voltage, current and temperature instantly and continuously detected by the voltage/current sensing element and the temperature sensing element of the torque control device, the microprocessor stably controls, via the current control module, the working current within a preset allowable range of variation for tightening torque control. Finally, the power source to the power impact torque tool is cut off and a warning is emitted when the range of the target torque value is reached.

In the above torque control system for power impact torque tool, based on an input modified torque value, the microprocessor of the torque control device modifies and adjusts the correspondence relationship curve of current and torque; whereby when the target torque value is input again, a new corresponding working current based on the adjusted correspondence relationship curve of current and torque is displayed, and the new corresponding working current is used to drive the power impact torque tool to perform the tightening operation.

In summary, in the torque control system and method for power impact torque tool according to the present invention, the torque sensing device built in or externally connected to the output end of the tool continuously sends sensing signals to the built-in or externally connected torque control device during the whole tightening process, and the microprocessor of the torque control device uses changes in voltage/current instantly and continuously detected by the voltage/current sensing element to stably control, via the voltage control module or the current control module, the working voltage or working current within a preset allowable range of variation to achieve the purpose of tightening torque control.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 5 shows the steps included in the torque control method for power impact torque tool according to the present invention;

FIG. 6A shows a first block diagram of different embodiments of a torque control systems for power impact torque tool according to the present invention, in which torque is controlled via voltage control;

FIG. 6B shows a first block diagram of different embodiments of a torque control systems for power impact torque tool according to the present invention, in which torque is controlled via voltage control;

FIG. 8D is a current versus actual output torque graph obtained from experimental observations of an embodiment of the torque control method for power impact torque tool according to the present invention;

DETAILED DESCRIPTION OF THE PREFERRED EMBODIMENTS

Figure 1A:
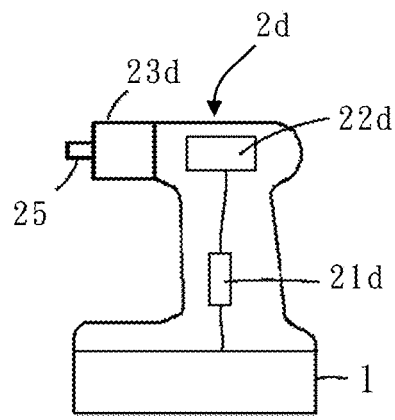
FIG. 1A illustrates a first conventional power impact torque tools with/without a built-in torque sensing device.
Figure 1B:
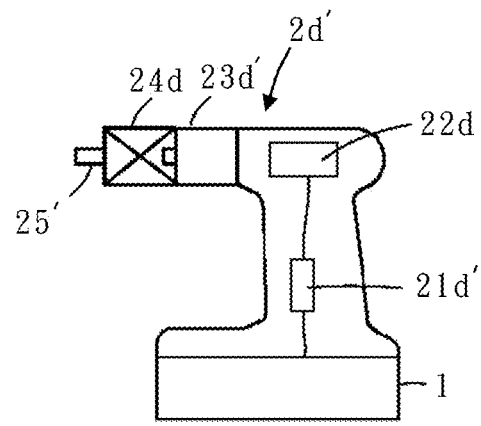
FIG. 1B illustrates a second conventional power impact torque tool with/without a built-in torque sensing device.

The present invention will now be described with some preferred embodiments thereof and by referring to the accompanying drawings. For the purpose of easy to understand, elements that are the same in the preferred embodiments are denoted by the same reference numerals.

Figure 1C:
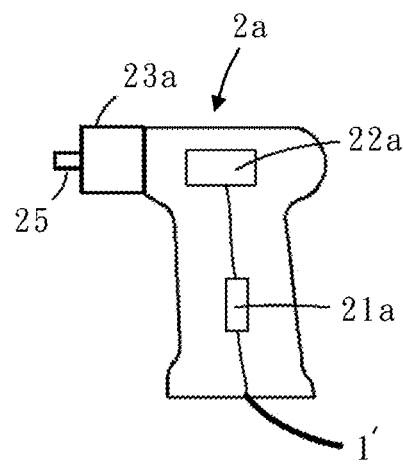
FIG. 1C illustrates a third conventional power impact torque tool with/without a built-in torque sensing device.
Figure 1D:
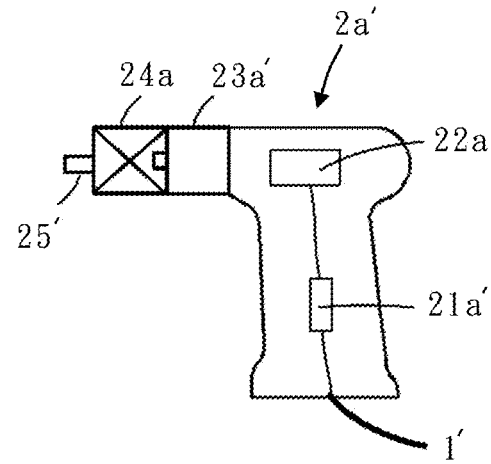
FIG. 1D illustrates a fourth conventional power impact torque tool with/without a built-in torque sensing device.
Figure 2A:
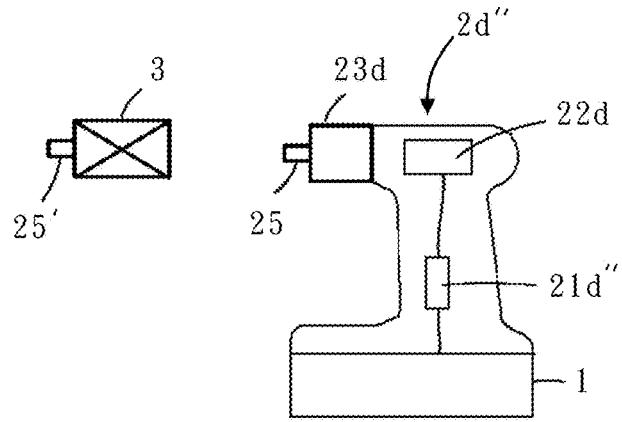
FIG. 2A illustrates a first embodiment of a power impact torque tool with a built-in or an externally connected torque sensing device according to the present invention.
Figure 2B:
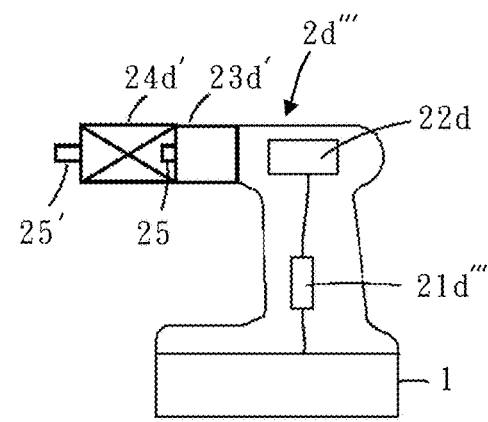
FIG. 2B illustrates a second embodiment of a power impact torque tool with a built-in or an externally connected torque sensing device according to the present invention.
Figure 2C:
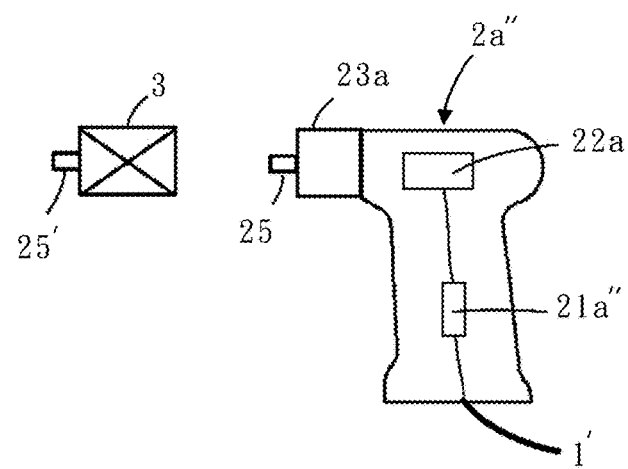
FIG. 2C illustrates a third embodiment of a power impact torque tool with a built-in or an externally connected torque sensing device according to the present invention.
Figure 2D:
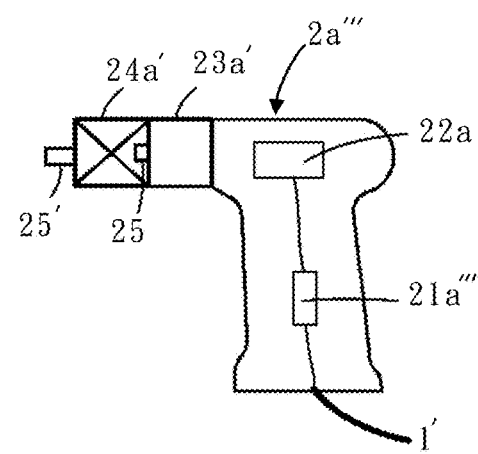
FIG. 2D illustrates a fourth embodiment of a power impact torque tool with a built-in or an externally connected torque sensing device according to the present invention.
Figure 3A:
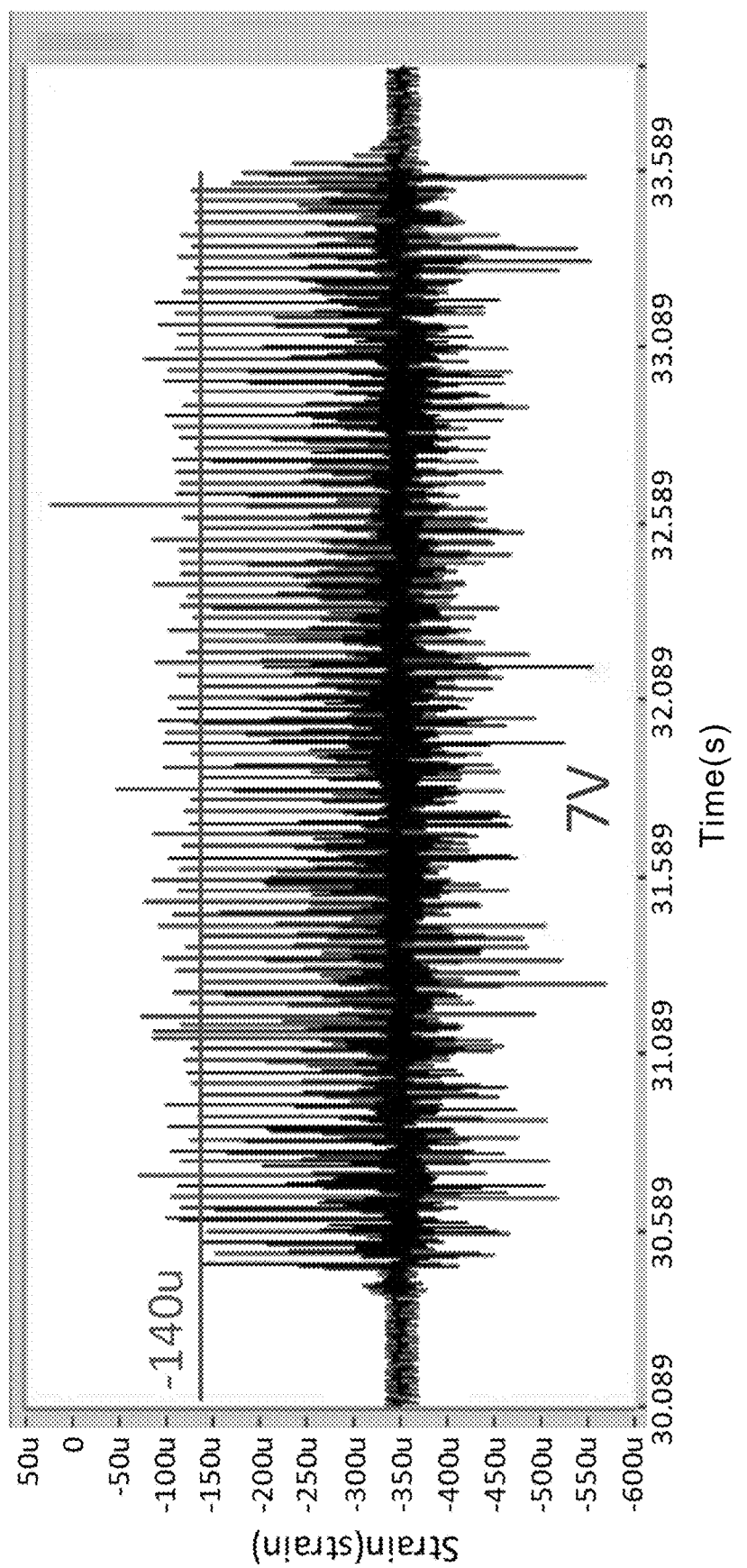
FIG. 3A is a voltage versus actual output torque graph obtained from experimental observations of an embodiment of a torque control method for power impact torque tool according to the present invention.
Figure 3B:
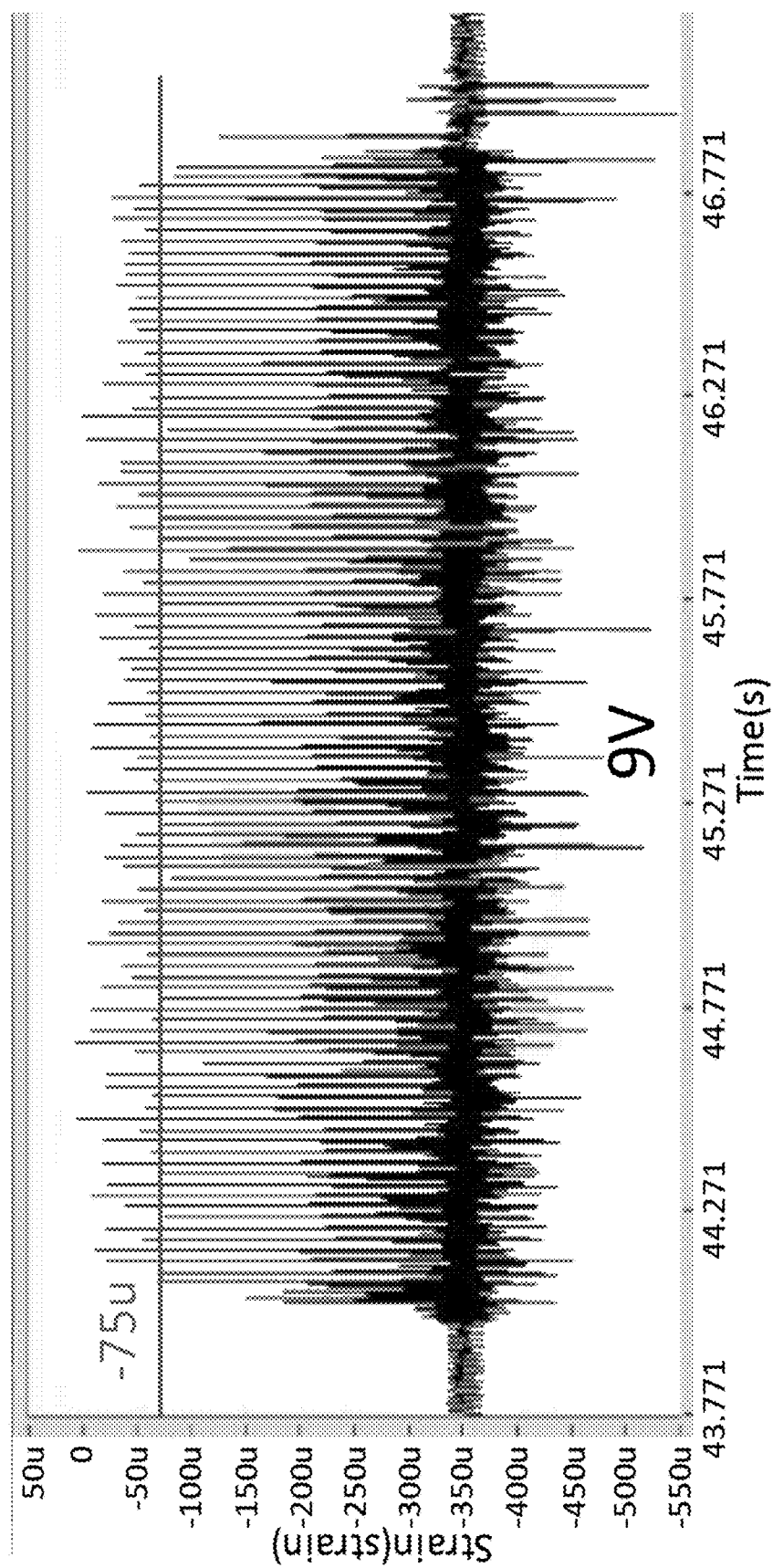
FIG. 3B is a voltage versus actual output torque graph obtained from experimental observations of an embodiment of a torque control method for power impact torque tool according to the present invention.
Figure 3C:
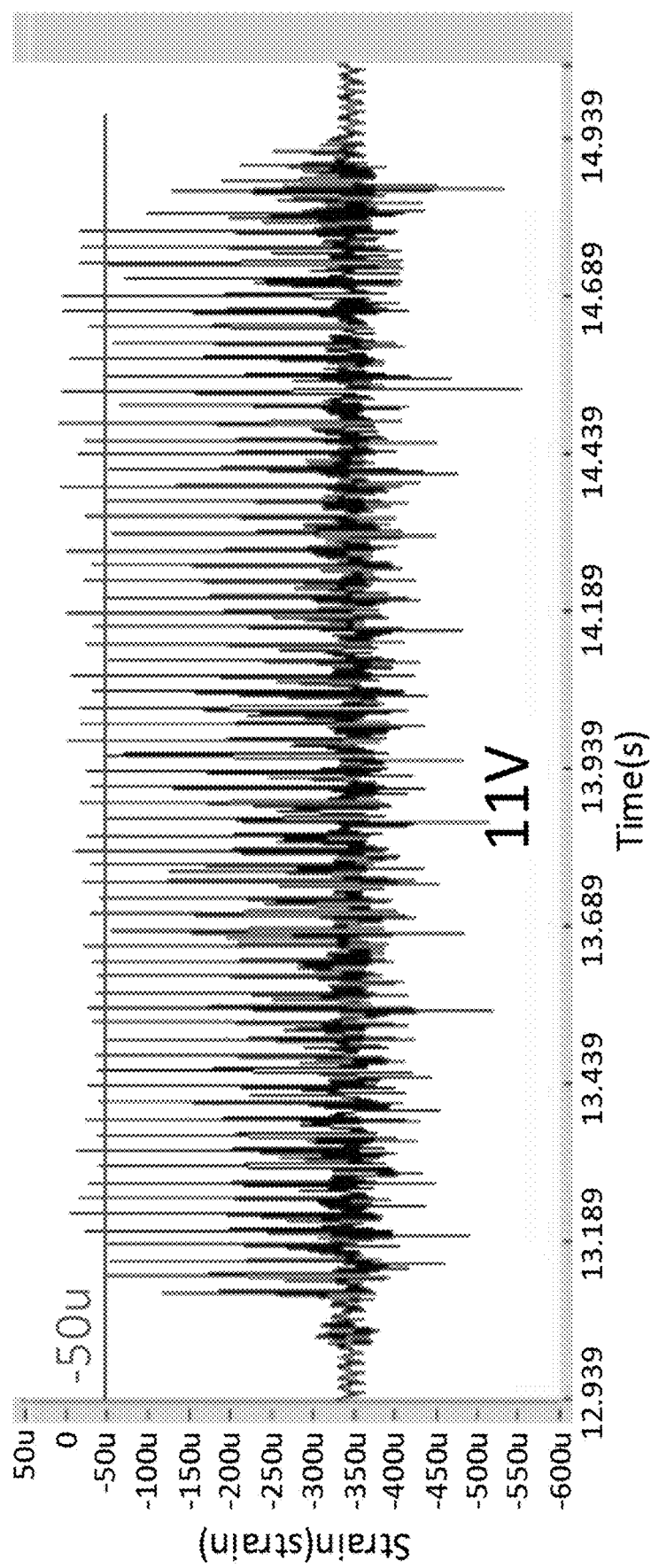
FIG. 3C is a voltage versus actual output torque graph obtained from experimental observations of an embodiment of a torque control method for power impact torque tool according to the present invention.
Figure 3D:
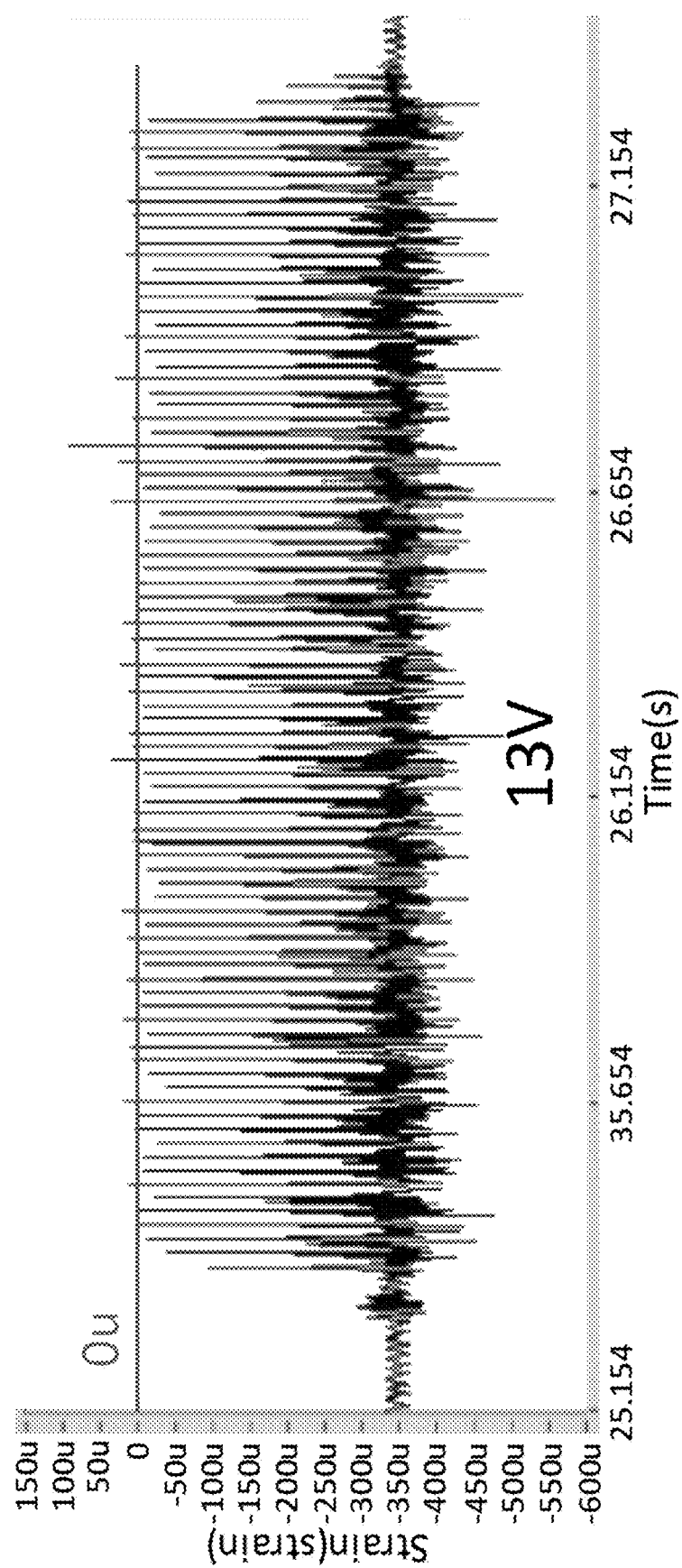
FIG. 3D is a voltage versus actual output torque graph obtained from experimental observations of an embodiment of a torque control method for power impact torque tool according to the present invention.
Figure 3E:
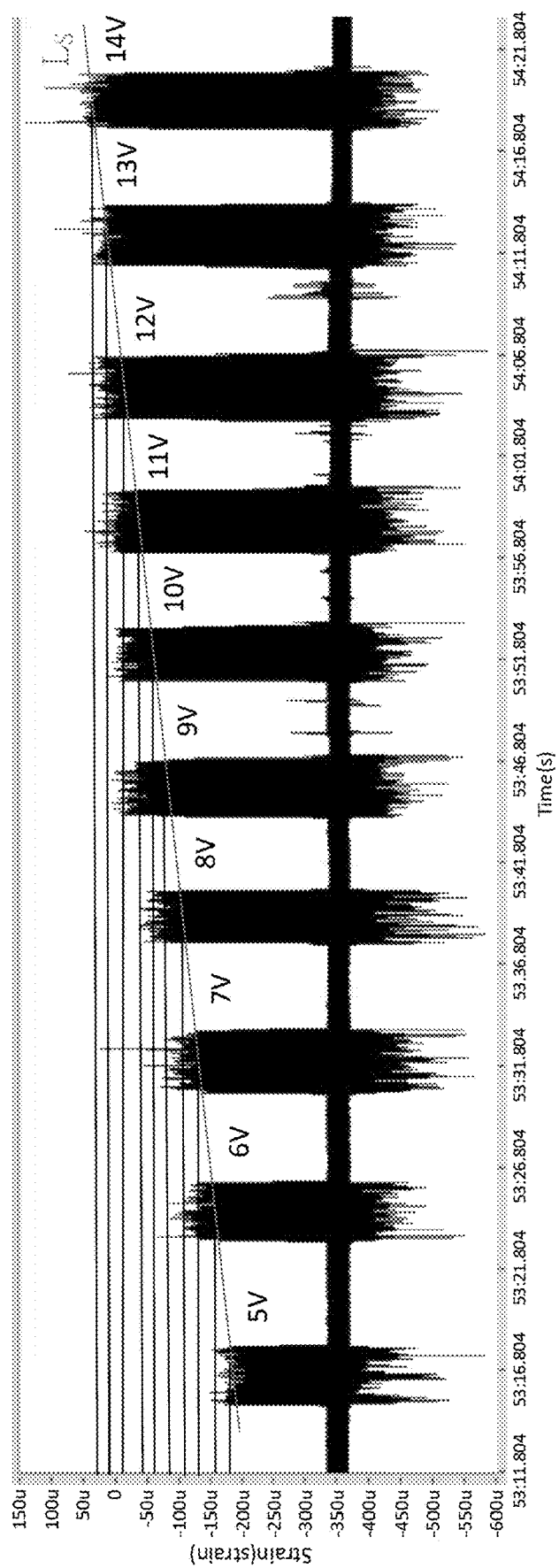
FIG. 3E is a voltage versus actual output torque graph obtained from experimental observations of an embodiment of a torque control method for power impact torque tool according to the present invention.
Figure 10:
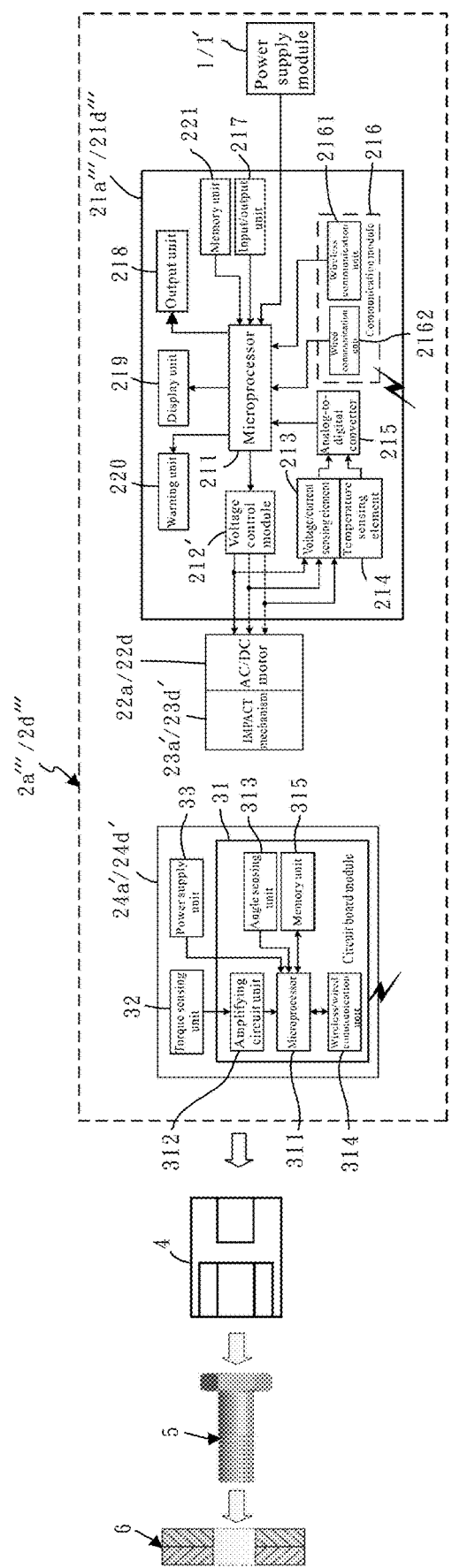
FIG. 10 shows a block diagram of another embodiment of the torque control system for power impact torque tool according to the present invention, in which torque is controlled via current.

Please refer to FIGS. 2A-2D, which illustrates different power impact torque tools, such as AC/DC motor-driven power impact wrenches, with a built-in torque sensing device or an externally connected torque sensing device according to the present invention. More specifically, in FIG. 2A, there is shown a battery-powered impact wrench with externally connected torque sensing device, generally denoted by numeral reference $2d''$, which is similar to the battery-powered impact wrench $2d$ of FIG. 1A but has a torque sensing device 3 externally connected to an output end 25 thereof and internally includes a torque control device $21d''$ for driving a bolt socket 4 and a bolt 5, which are corresponding to each other in size and type, via an output end $25'$ of the externally connected torque sensing device 3 to tighten a workpiece 6 using the bolt 5, as shown in FIGS. 6A-6B and 10. In FIG. 2B, there is shown a battery-powered impact wrench with built-in torque sensing device, generally denoted by numeral reference $2d'''$, which is similar to the battery-powered impact wrench $2d''$ of FIG. 2A but has a built-in torque sensing device $24d'$ provided in a housing thereof between an internal impact mechanism $23d'$ and an output end 25 and internally includes a torque control device $21d'''$ for driving a bolt socket 4 and a bolt 5, which are corresponding to each other in size and type, via an output end $25'$ to tighten a workpiece 6 using the bolt 5. In FIG. 2C, there is shown a mains-powered impact wrench with externally connected torque sensing device, generally denoted by numeral reference $2a''$, which is similar to the mains-powered impact wrench $2a$ of FIG. 1C but has a torque sensing device 3 externally connected to an output end 25 thereof and internally includes a torque control device $21a''$ for driving a bolt socket 4 and a bolt 5, which are corresponding to each other in size and type, via an output end $25'$ of the externally connected torque sensing device 3 to tighten a workpiece 6 using the bolt 5. In FIG. 2D, there is shown a mains-powered impact wrench with built-in torque sensing device, generally denoted by numeral reference $2a'''$, which is similar to the mains-powered impact wrench $2a''$ of FIG. 2C but has a built-in torque sensing device $24a'$ provided in a housing thereof between an internal impact mechanism $23a'$ and an output end 25 and internally includes a torque control device $21a'''$ for driving a bolt socket 4 and a bolt 5, which are corresponding to each other in size and type, via an output end 25' to tighten a workpiece 6 using the bolt 5. According to FIGS. 2A-2D, the battery-powered and the mains-powered power impact torque tools, either with an externally connected torque sensing device 3 or a built-in torque sensing device 24d', 24a', all include, in addition to the torque sensing device, a microprocessor that uses sensing signals continuously sent by the torque sensing device back to the torque control device in a wireless or a wired manner during the tightening operation to perform related torque control or rotational speed control. Further, by observing the pulse characteristics of the power impact tools with torque sensing device presented during the tightening operation and the actually measured data, it is proven a torque control method for power impact torque tool provided by the present invention can thoroughly solve the problem of difficult tightening torque control as found in the conventional power impact tools.

Figure 4:
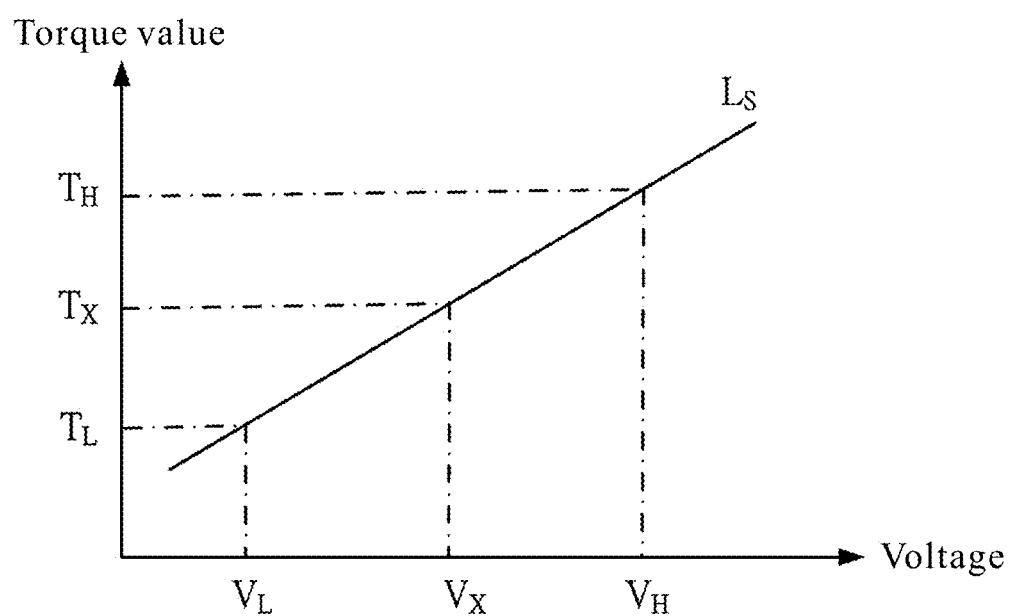
FIG. 4 is a relationship curve of high/low working voltages and measured corresponding high/low torques, which is obtained using the first embodiment of the torque control method for power impact torque tool according to the present invention.

Please refer to FIGS. 3A-3E, which is a voltage versus actual output torque graph obtained from experimental observations of a first embodiment of a torque control method for power impact torque tool according to the present invention. Data shown in the graph of FIGS. 3A-3E are obtained by using the same one power impact torque tool with the same one externally connected torque sensing device and stably controlling the working voltage of the tool to be within a very small range of variation. The tool is driven by different voltages of 5V, 6V, 7V, 8V, 9V, 10V, 11V, 12V, 13V and 14V to separately tighten bolts of the same material and size against workpieces of the same properties for the same duration of impact time. Torque values measured in all the tightening operations driven by different voltage levels are relatively regular and stable. Herein, only a part of the obtained graph is abstracted and described. As shown in FIG. 4, an almost linear relationship between the high/low voltages and the measured corresponding high/low torque values is presented. Based on the above theory and experimental data, it is proven that, with the torque control method of the present invention, when the same one power impact torque tool, such as a power impact torque wrench, is driven by a stable working voltage to tighten workpieces of the same joint hardness for the same duration of tightening time, similar tightening torque values can always be output. In other words, for example, when using a power torque wrench, the tightening torque can always be controlled within a specific target range, provided the variation in percentage of the working voltage is monitored and controlled during the whole tightening process to maintain the working voltage within a stable range of variation.

FIG. 4 shows a relationship curve of high/low working voltages and measured corresponding high/low torques, which is obtained using the first embodiment of the torque control method for power impact torque tool according to the present invention. The relationship curve in FIG. 4 is plotted based on the actually measured data of high/low torques shown in FIGS. 3A-3E. According to the characteristics of the power impact and the oil-pulse torque tools, control parameters, such as the same voltage and the same duration of tightening time, can be preset for the same one tool. In this manner, when the tool operates with a stable voltage that is under monitoring and controlling during the whole tightening process, the same torque can be stably output when the workpieces to be tightened are the same in joint hardness. For this purpose, first detect a highest voltage $V_H$ and a lowest voltage $V_L$ of the tool in normal operation at its existing output capacity. Then, use the highest voltage $V_H$ and a lowest voltage $V_L$ to drive the tool and a torque sensing device thereof to perform a torque calibration operation, so as to obtain a highest torque $T_H$ and a lowest torque $T_L$ that are correspondingly produced at the highest voltage and the lowest voltage, respectively. Thereafter, use the linear regression to establish a relationship curve of voltage and torque $L_S$ using the highest voltage and the lowest voltage and the corresponding highest torque and lowest torque. Accordingly, when a target torque value falling between the highest and the lowest torque of the tool that are obtained from the above torque calibration operation, the microprocessor of the torque control device according to the present invention for the power impact torque tool instantly computes based on the correspondence relationship between voltage and torque stored in the tool and automatically adjusts the tool to a corresponding working voltage for driving the tool to perform a tightening operation. During the whole tightening process, the working voltage is under continuous monitoring and controlling to be maintained in a stable state for performing the tightening operation. When the target torque value is reached, the power source to the tool is cut off and the power impact torque tool stops operating. In this manner, the output torque of the tool can be controlled within a preset allowable range. Therefore, it is no longer necessary to worry about that the torque control precision might be affected by slow response due to delayed signal transmission between torque control element and torque sensing element. However, the relationship between the calibrated torque values and the voltages might not be fully linear due to many influential factors, such as the clearance between the socket/bolt and the workpiece, the gesture how the tool is held, and the conditions of the workpiece to be tightened. In practical applications, the amount of deviation from the linear relationship curve, either positive or negative, can be considered as basic error in torque control, which can still be adjusted to finally obtain satisfactory torque control precision.

FIG. 5 shows the steps included in the torque control method for power impact torque tool according to the present invention. As shown, the torque control method of the present invention includes the following steps: (S11) connecting a power supply module to the power impact torque tool, and driving a torque sensing device built in the tool or externally connected to an output end of the tool via a torque control device built in or externally connected to the tool, so as to detect a highest voltage $V_H$ and a lowest voltage $V_L$ of the tool under normal operation at its existing output capacity; (S12) driving the tool and the torque sensing device and tightening a bolt against a workpiece to be tightened, so as to perform a torque calibration operation and establish a relationship curve of the highest/lowest voltages of the tool in normal operation and the corresponding highest/lowest torques thereof; (S13) entering a target torque value that falls between the highest and the lowest torque value shown in the relationship curve, using a microprocessor of the torque control device to amplify and compute the entered target torque value and compares the entered torque value with the relationship curve that has been previously stored in a memory unit, so as to obtain a working voltage corresponding to the target torque value for driving the power impact torque tool to perform a tightening operation; and (S14) during the tightening process, using sensing signals instantly and continuously sent by the torque sensing device to the torque control device to perform the tightening operation under closed-loop torque control, and, based on changes in voltage, current and motor temperature continuously detected by a voltage/current sensing element and a temperature sensing element of the torque control device, the microprocessor stably controls, via a voltage control module, the working voltage to be kept within a preset allowable range of variation to achieve the purpose of tightening torque control, and finally, cutting off the power source and emitting a warning when the range of the target torque value is reached.

Preferably, the torque control method for power impact torque tool according to the present invention can further include the following steps of using the torque sensing device of the present invention or any other torque calibrating tool to manually calibrate the highest/lowest torque values corresponding to the highest/lowest voltages; inputting the calibrated corresponding highest/lowest torque values to the torque control device; using the voltage/current sensing element of the torque control device to obtain changes in voltage/current during the tightening process; and storing a kinetic relationship curve, which is established based multiple groups of average torque values obtained at multiple points in the process of torque calibration, in a memory unit of the torque control device.

Preferably, the torque control method for power impact torque tool according to the present invention can further include the following steps of pushing a calibration key according to a preset auto-calibration mode, so that the torque control device automatically detects the highest/lowest voltages of the tool in normal operation and works with the torque sensing device built in or externally connected to the output end of the tool to carry out, in accordance with a preset program, the calibration of multiple groups of voltages and corresponding torque values at multiple points between the highest and the lowest voltage, so as to obtain average sampling data of the multiple groups of voltages and corresponding torque values at multiple points for establishing the relationship curve of the tool's high/low voltages and corresponding torque values; and then storing the relationship curve in a memory unit of the torque control device.

Preferably, the relationship curve can be finely adjusted or modified in the event the tightening torque could not reach the target torque value or falls out of high/low limits of the allowable range of the target torque value. This is mainly because, in establishing the relationship curve of the torque and the high/low working voltage of the torque tool, there might be some difference between the workpieces used in calibration and the workpieces to be tightened in an actual tightening operation in terms of their hardness as well as difference between the condition of bolts used, which results in a relatively big error between the actually measured tightening torque value and the target torque value. In this case, the working voltage can be finely adjusted to modify the torque, so that the tightening torque is closer to the target torque value. Therefore, in practice, calibration of the relationship curve of the high/low working voltages and high/low output torques is preferably carried out based on the actual workpiece to be tightened. Otherwise, it might be necessary to upgrade the control precision through a torque modification mode.

Preferably, a necessary torque modification can also be carried out when the following situation occurs. That is, when a displayed actual torque value is close to the high/low limit of the target torque value, a torque modification key can be pushed for the microprocessor to automatically finely adjust the working voltage higher or lower along the relationship curve. Then, restart the power impact torque tool, and a torque value even closer to the target torque value can be obtained. Or, in the case a relatively big difference exists between the torque value detected by the client's quality control (QC) personnel and the actual torque value displayed by the torque control device but both of the displayed actual torque value and the detected torque value show very good reproducibility and stability, the torque modification key can be pushed and held for about 1 second until a numeric keyboard is shown in a display unit of the torque control device. Then, enter the torque value detected and approved by the client and push ENTER key. The microprocessor will automatically finely adjust the working voltage higher or lower along the relationship curve. Then, input the original target torque again and start the power impact torque tool to perform the tightening operation. After the tightening operation, the QC personnel can check again. In this manner, it is able to reach the required torque control precision.

Preferably, the torque control method for power impact torque tool according to the present invention can further include the following steps of setting torque-control-related parameters before establishing the above-mentioned relationship curve, such as setting the highest working voltage to be 90% or 95% of a system detectable highest voltage value for use as an additional kinetic energy required in torque compensation. That is, when the tool fails to reach the target torque due to, for example, the attenuation of the tool's power output ability during the process of use, or the declination of the initially set torque caused by rising temperature of the oil-pulse producing from hydraulic cylinder after continuous operation over a period of time, or the use of the same torque setting to tighten workpieces of different joint hardness, or the changing postures of a tired operator in handling the tool after having been working over a long time, the microprocessor of the torque control device can automatically adjust the working voltage higher along the relationship curve for torque compensation, and cuts off the power source when the target torque is reached or emits a warning via a display unit of the torque control device when the voltage value has been adjusted to its high/low limit but the tool still fails to reach the target torque value.

Preferably, the torque control method for power impact torque tool according to the present invention can further include the following steps of monitoring and controlling the changes of voltage throughout the whole tightening process; controlling and cutting off the power source to the power impact torque tool when the change in voltage falls out of an allowable range; and emitting a warning via a warning unit of the torque control device.

Please refer to FIGS. 6A-6B, which shows block diagrams of different embodiments of a torque control system for power impact torque tool according to the present invention. In these embodiments, voltage is used to control the torque of a power impact torque tool. As shown, the torque control system of the present invention includes a torque control device 21d'', 21d''', 21a'', 21a''' mounted between a power supply module 1, 1' and an AC motor 22a or a DC motor 22d of the power impact torque tool. The torque control device 21d'', 21d''', 21a'', 21a''' includes a microprocessor 211, as well as a voltage control module 212, a voltage/current sensing element 213, a temperature sensing element 214, an analog-to-digital converter 215, a communication module 216, an input unit 217, an output unit 218, a display unit 219, a warning unit 220 and a memory unit 221 electrically connected to the power supply module 1, 1' via the microprocessor 211 to drive the AC/DC motor 22a, 22d. In FIG. 6A, the illustrated torque control system can be applied to any of a mains-powered impact torque tool with built-in torque sensing device, generally denoted by numeral reference 2a''' and a battery-powered impact torque tool with built-in torque sensing device, generally denoted by numeral reference 2d''', and includes a torque sensing device 24a', 24d' built in a housing of the power impact torque tool and located between an output end 25 of an impact mechanism 23a', 23d' and an output shaft 25' of the power impact torque tool. On the other hand, in FIG. 6B, the illustrated torque control system can be applied to any of a mains-powered impact torque tool with externally connected torque sensing device, generally denoted by numeral reference 2a'' and a battery-powered impact torque tool with externally connected torque sensing device, generally denoted by numeral reference 2d''', and includes a torque sensing device 3 externally connected to the tool and located between an output shaft 25 of the tool and a socket 4. The built-in torque sensing device 24a', 24d' and the externally connected torque sensing device 3 respectively include a torque sensing unit 32, a power supply unit 33 and a circuit board module 31. The circuit board module 31 further includes an amplifying circuit unit 312, a microprocessor 311, an angle sensing unit 313, a wireless/wired communication unit 314 and a memory unit 315. In a torque calibration operation for the tool, first apply a torque to the torque sensing unit 32 and the angle sensing unit 313, and a relationship between the deformation of the torque sensing unit 32 and the applied torque is stored in the memory unit 315. In the process of tightening operation, the torque sensing device 24a', 24d', instantly and continuously sends torque/angle sensing signals to the communication module 216 of the torque control device 21d'', 21d''', 21a'', 21a''' via the wireless/wired communication unit 314. The microprocessor 211 of the torque control device amplifies and computes the received sensing signals and compares the signals with a kinetic relationship curve stored in the memory unit 221 to obtain a working voltage that is corresponding to a target torque value, so as to perform a tightening operation under closed-loop torque control. During the tightening operation, the voltage/current sensing element 213 and the temperature sensing element 214 instantly and continuously detect changes in voltage, current and temperature. Based on these detected changes, the microprocessor 211 stably controls, via the voltage control module 212, the working voltage to be kept within a preset allowable range of variation to achieve the purpose of tightening torque control. When the range of the target torque value is reached, the power source 1, 1' is cut off, the warning unit 220 emits a warning, and a control result is displayed in the display unit 219.

The voltage control module 212 can be a pulse-width modulation (PWM) controller that modulates and supplies a stable voltage to drive the motor, or can be a proportional-integral-derivative (PID) controller that compensates the voltage according to an error amount, i.e. increases or decreases the voltage in proportion to an existing error.

The microprocessors 211, 311 can automatically adjust an initially established correspondence relationship curve of voltage and torque according to a modified torque value input by an operator after a torque calibration. Based on the modified correspondence relationship curve of voltage and torque, the target torque value can be input again to obtain a new working voltage. The new working voltage is then used to drive the power impact torque tool to perform a tightening operation.

In the case the tightened torque could not reach the target torque value or falls out of high/low limits of the allowable range of the target torque value, fine adjustment or modification of the relationship curve can be carried out. This is mainly because, in establishing the relationship curve of the torque and the high/low working voltage of the tool, there might be some difference between the workpiece used in the calibration and the workpiece to be tightened in an actual tightening operation in terms of their hardness, or between the condition of bolts used for tightening, which will lead to a relatively big error in the actual tightening torque value. In this case, the working voltage can be finely adjusted to modify the torque, so that the tightening torque is closer to the target torque value. Therefore, in practice, the calibration of the relationship curve of the torque and the high/low working voltage is preferably carried out based on the actual workpiece to be tightened. Otherwise, it might be necessary to upgrade the control precision through a torque modification mode. Preferably, a torque modification is carried out when the following situation occurs. That is, when the displayed actual torque value is close to the high/low limit of the target torque value, a torque modification key can be pushed and the microprocessor will automatically finely adjust the working voltage higher or lower along the relationship curve. Then, restart the power impact torque tool, and a torque value even closer to the target torque value can be obtained.

In the case a relatively big difference exists between the torque value detected by the client's quality control (QC) personnel and the actual torque value displayed by the torque control device but both of the displayed actual torque value and the detected torque value show very good reproducibility and stability, the microprocessor can modify the displayed actual torque value to be the same as the measured torque value from the QC personnel. At this point, push and hold the torque modification key for about 1 second until a numeric keyboard is shown in the display unit of the torque control device. Then, enter the client detected and approved torque value and push the ENTER key. The microprocessor will automatically finely adjust the working voltage higher or lower along the relationship curve. Then, input the original target torque again and start the power impact torque tool to perform the tightening operation. After the tightening operation, the QC personnel can check again. In this manner, it is able to reach the required torque control precision.

According to the characteristics of the power impact and the oil-pulse torque tools, when using a second embodiment of the torque control system and method according to the present invention, conditions of operation, such as the same current and the same duration of tightening time, can be preset for the same one tool. In this manner, when the tool operates with a stable current that is under monitoring and controlling during the whole tightening process, the same torque can be stably output when the workpieces to be tightened are the same in hardness. For this purpose, a highest and a lowest current of the tool in normal operation at its existing output capacity are detected before performing the tightening operation. Then, the tool and the torque sensing device thereof are driven to calibrate the highest and the lowest tightening ability or torque that are correspondingly produced at the highest and the lowest current condition, respectively, so as to establish a relationship curve of current and corresponding torque. Thereafter, enter a target torque value falling between the highest and the lowest torque value on the relationship curve to obtain a working current corresponding to the target torque value. The power impact torque tool is then restarted to drive the torque sensing device built therein or externally connected to the output end thereof for performing a tightening operation. Throughout the tightening process, the torque sensing device continuously sends torque/angle sensing signals to the torque control device; the microprocessor of the torque control device amplifies and computes the received sensing signals and compares the signals with the relationship curve stored in the memory unit to locate a working current that is corresponding to the target torque value, so as to perform the tightening operation under closed-loop torque control. During the tightening operation, the torque sensing device continuously sends sensing information to the torque control device in a wireless or a wired manner, and the voltage/current sensing element and the temperature sensing element instantly and continuously detect changes in voltage/current and temperature, respectively. Based on the sensing information and the detected voltage/current/temperature changes, the microprocessor stably controls, via a current control module, the working current to be kept within a preset allowable range of variation to achieve the purpose of tightening torque control. When the range of the target torque value is reached, the power source is cut off, and a warning is emitted. After the tightening operation is performed, the tightened torque is calibrated again to see whether it still falls in the preset range. When necessary, the above-mentioned torque modification can be carried out to control the tightening torque to a more precise range. Therefore, it is no longer necessary to pursue a power impact torque tool having a torque-control related mechanism with high manufacturing precision. Just with the torque control system and method of the present invention, either the power impact or the oil-pulse torque wrench can be used to easily perform more economical, reliable, effectively and precise tightening operation than any other conventional torque control technique.

Figure 7A:
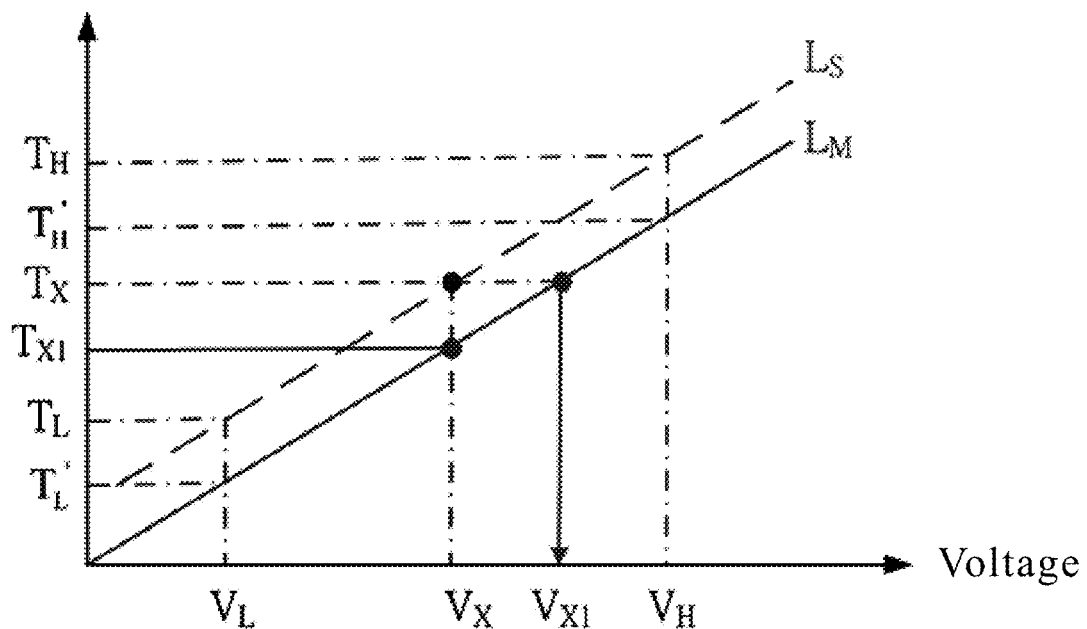
FIG. 7A shows how to modify the correspondence relationship curve of voltage and torque established using the embodiment of the torque control method for power impact torque tool according to the present invention.
Figure 7B:
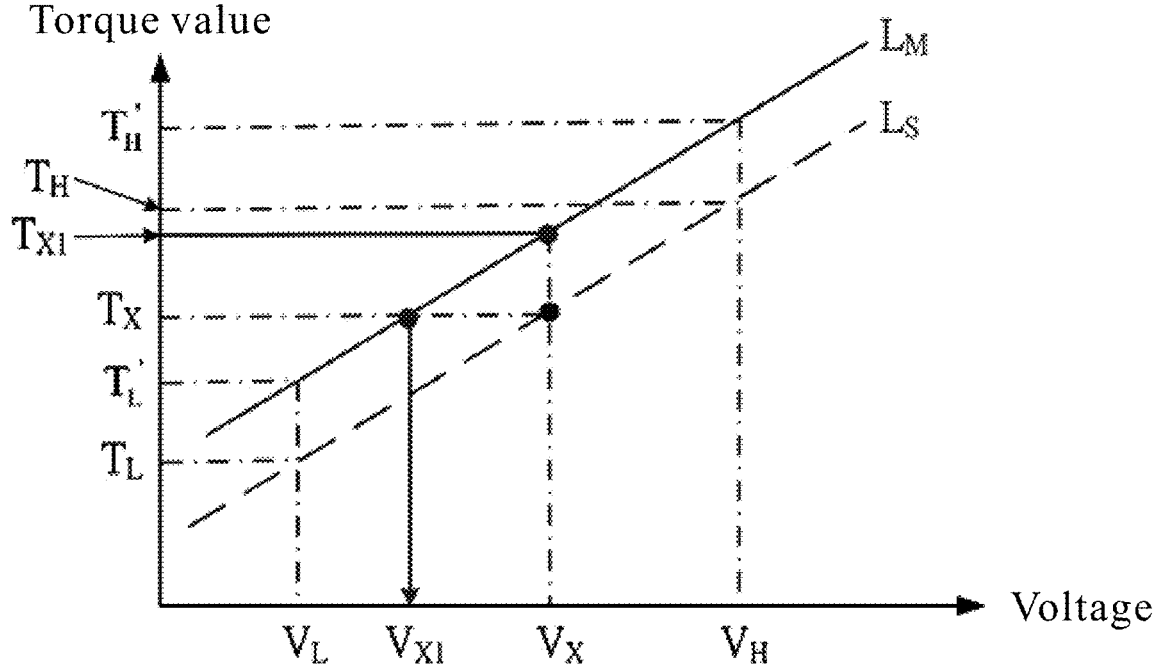
FIG. 7B shows how to modify the correspondence relationship curve of voltage and torque established using the embodiment of the torque control method for power impact torque tool according to the present invention.

FIGS. 7A-7B show how to modify the correspondence relationship curve of voltage and torque according to the torque control method of the present invention. Please refer to FIGS. 7A-7B along with FIGS. 6A-6B. An operator can use a frequently used or a trustable torque calibration tool to calibrate the torque after the tightening operation is completed. In the event a relatively big difference exists between the torque value obtained from the calibration and the target torque value $T_X$, a MODIFY key (not shown) of the input unit 217 of the torque control device 21d'', 21d''', 21a'', 21a''' can be pushed to enter the calibrated torque value and store the same in the memory unit 221. The microprocessor 211 will automatically adjust the correspondence relationship curve of voltage and torque, which is generally denoted by $L_S$, according to the modified torque value $T_{X1}$. The adjusted correspondence relationship curve of voltage and torque is generally denoted by $L_M$. Meanwhile, a new controllable range of torque is set and displayed. Briefly speaking, in the case the modified torque value $T_{X1}$ entered is smaller than the target torque value $T_X$, the adjusted correspondence relationship curve of voltage and torque will shift downward, as shown in FIG. 7A. On the other hand, in the case the modified torque value $T_{X1}$ entered is larger than the target torque value $T_X$, the adjusted correspondence relationship curve of voltage and torque will shift upward, as shown in FIG. 7B. After the target torque value is entered again, a new corresponding working voltage $V_{X1}$ is obtained on the adjusted correspondence relationship curve of voltage and torque $L_M$. After the new working voltage $V_{X1}$ is used to drive the battery-powered impact wrench 2d'', 2d''' or the mains-powered impact wrench 2a'', 2a''' to perform the tightening operation, the calibration can be carried out according to actual need to check whether a correct target torque value has been reached. Therefore, the torque control method of the present invention not only precisely controls the output torque of the power impact torque tool, but also meets practical need in use by allowing a user to carry out fine adjustment of torque via torque calibration according to different conditions of the workpieces to be locked.

It is noted that, in the event a voltage falling out of the preset allowable range of variation is detected in the tightening process, a warning will be instantly emitted by the warning unit 220 of the torque control device 21d'', 21d''', 21a'', 21a''' or the power supply is cut off by the voltage control module 212 until the voltage returns to the stable voltage range. At this point, the tightening operation can be continued. In addition, the setting of the allowable range of variation has a close relation to the precision of the torque value in the actual tightening operation. Briefly speaking, when a larger allowable range of variation is set, the precision of torque control will be lower.

Figure 8A:
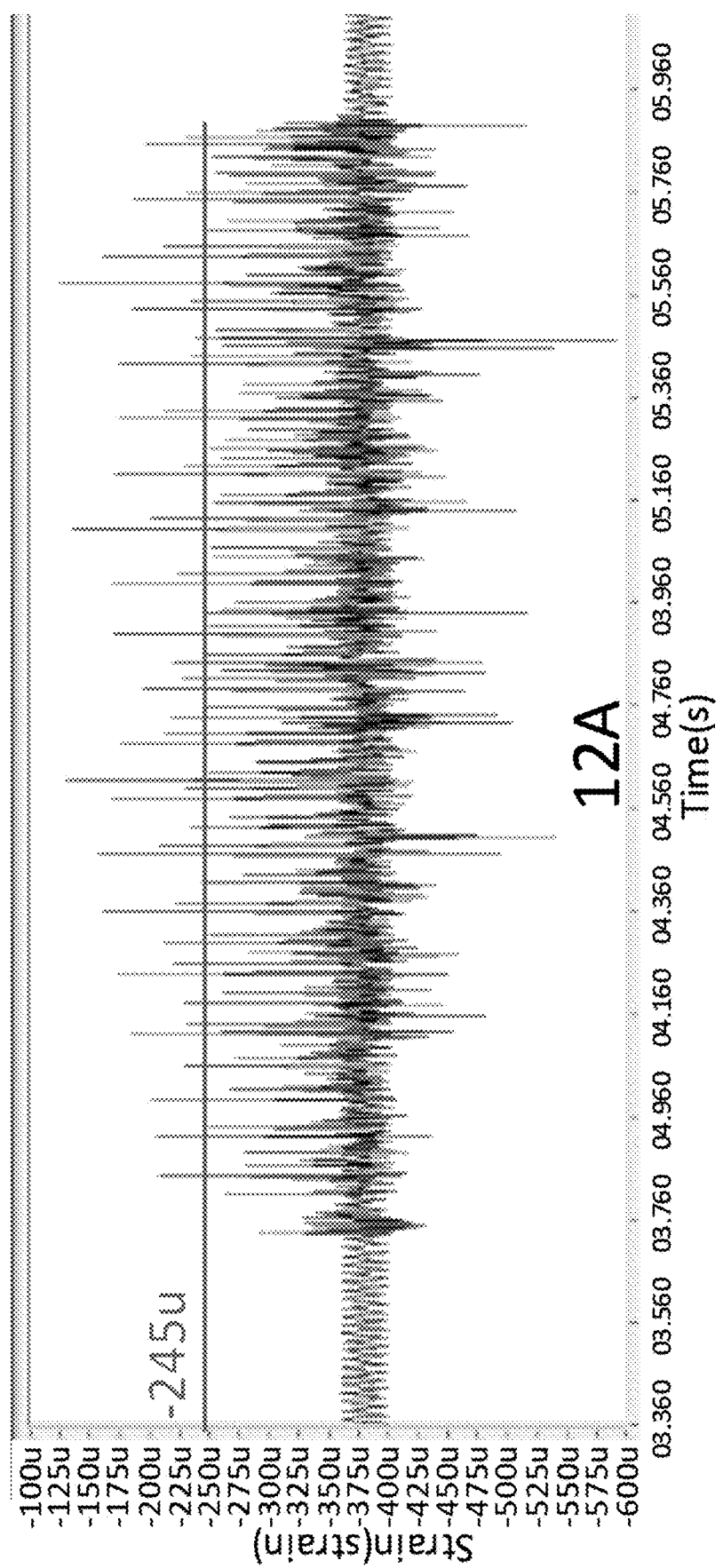
FIG. 8A is a current versus actual output torque graph obtained from experimental observations of an embodiment of the torque control method for power impact torque tool according to the present invention.
Figure 8B:
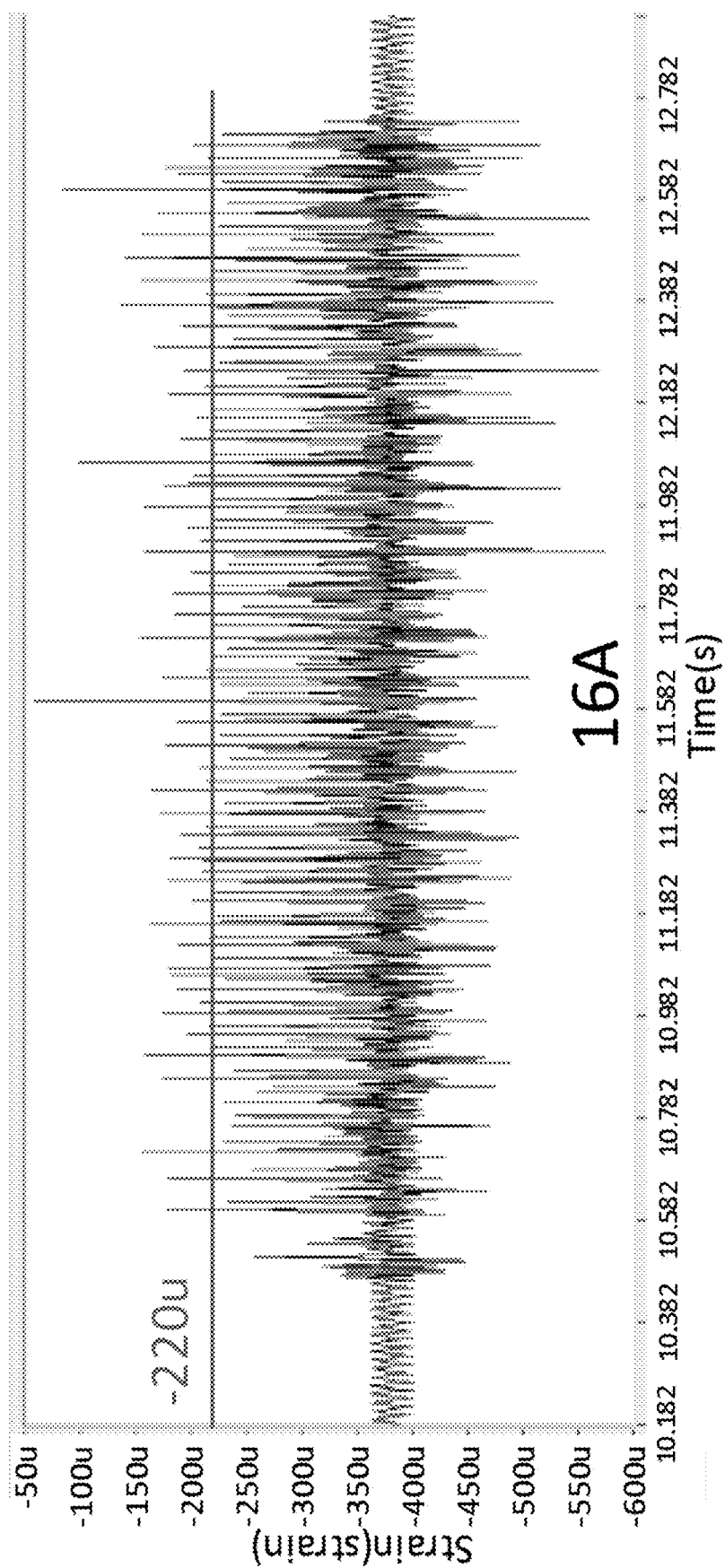
FIG. 8B is a current versus actual output torque graph obtained from experimental observations of an embodiment of the torque control method for power impact torque tool according to the present invention.
Figure 8C:
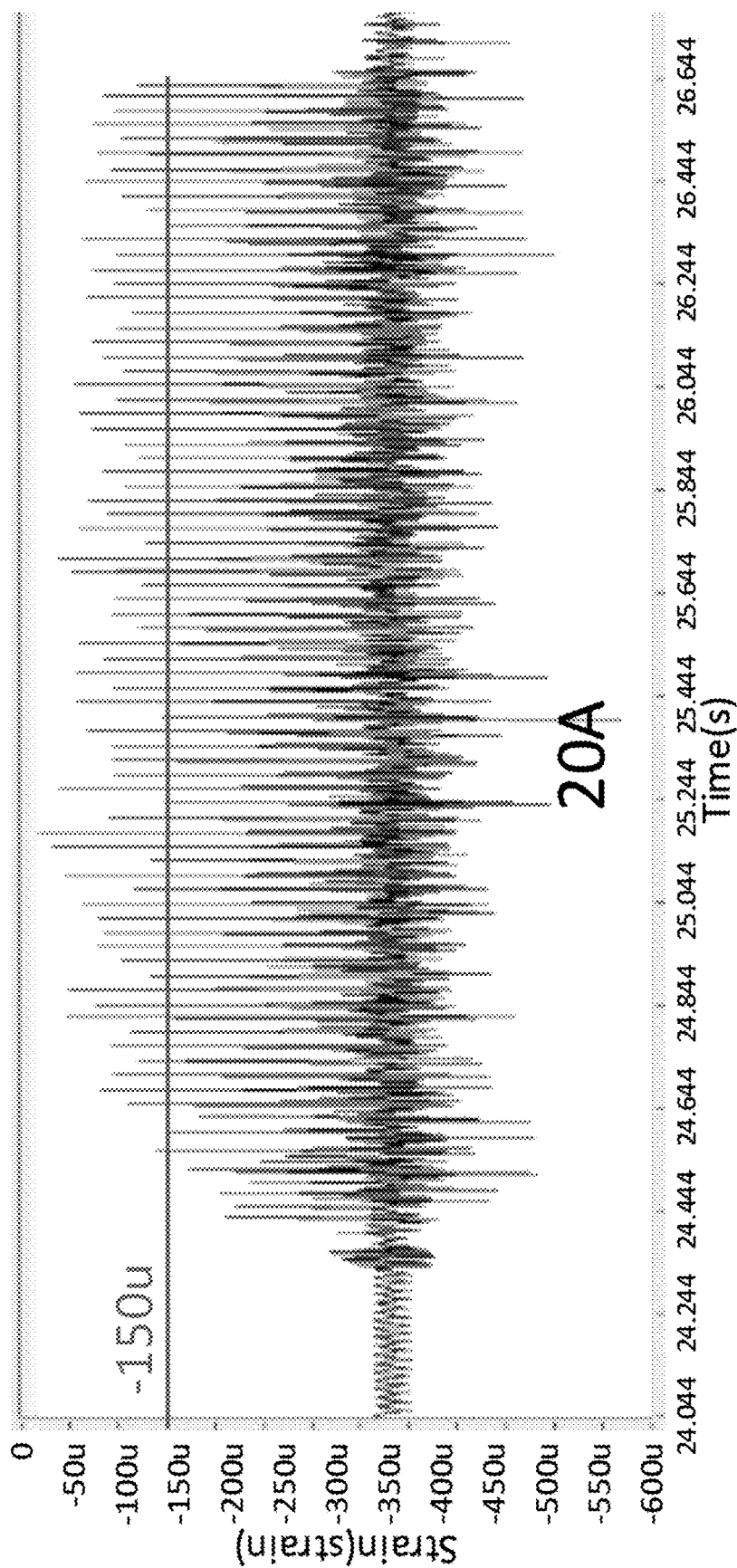
FIG. 8C is a current versus actual output torque graph obtained from experimental observations of an embodiment of the torque control method for power impact torque tool according to the present invention.
Figure 8E:
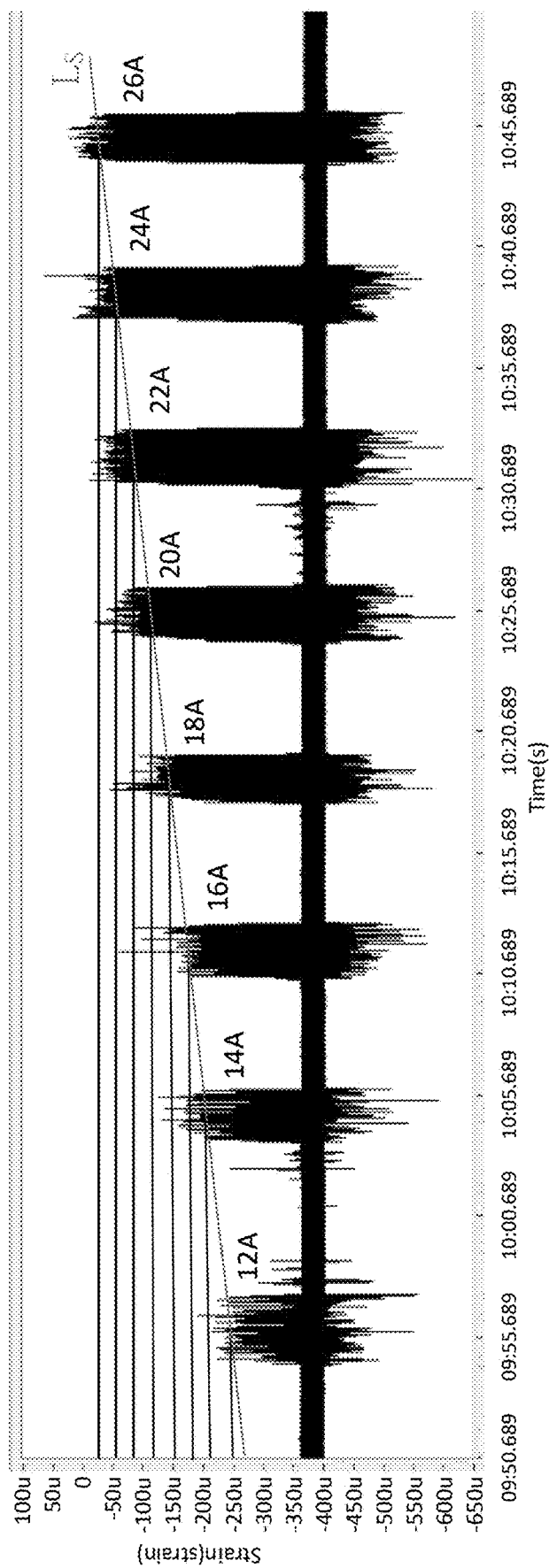
FIG. 8E is a current versus actual output torque graph obtained from experimental observations of an embodiment of the torque control method for power impact torque tool according to the present invention.
Figure 9:
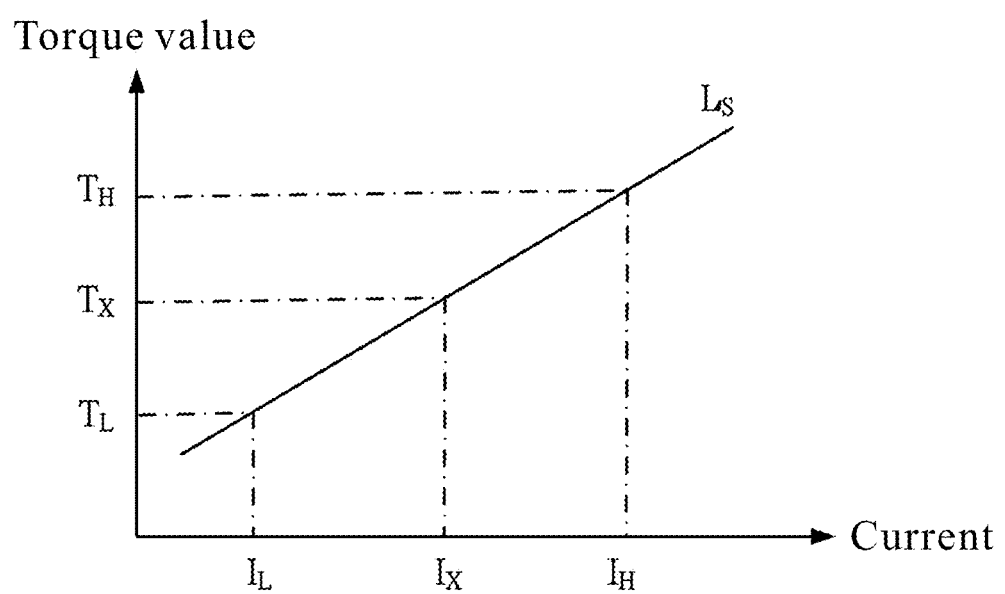
FIG. 9 is a relationship curve of high/low working currents and measured corresponding high/low torques, which is obtained using the second embodiment of the torque control method for power impact torque tool according to the present invention.

Please refer to FIGS. 8A-8E, which depict a current versus actual output torque graph obtained from experimental observations of a second embodiment of the torque control method for power impact torque tool according to the present invention. In an experiment conducted by the inventor on the same one power impact torque wrench with the same one externally connected torque sensing device, the working current for driving the torque wrench is stably controlled to be kept within a very small range of variation, and the torque wrench is driven using different amounts of current, including 12 A, 14 A, 16 A, 18 A, 20 A and 22 A, to separately tighten bolts of the same material and size against workpieces of the same properties for the same duration of impact time. The experimental results indicate the measured output torques throughout the tightening operations are relatively regular and stable. Herein, only a part of the obtained graph is abstracted and described. As shown in FIGS. 8A-9, an almost linear relationship between the high/low currents and the measured corresponding high/low torque values is presented. Based on the above theory and experimental data, it is proven that, with the torque control method of the present invention, when the same one power impact torque tool, such as a power impact torque wrench, is driven by a stable working current to apply a torque on workpieces of the same hardness for the same duration of tightening time, similar tightening torque values can always be obtained. In other words, for example, when using a power impact torque wrench, the tightening torque can always be controlled within a specific target range, provided the variation in percentage of the working current is monitored and controlled throughout the whole tightening process to maintain the working current within a stable range of variation.

FIG. 9 shows a relationship curve of high/low working currents and measured corresponding high/low torques, which is obtained using the second embodiment of the torque control method for power impact torque tool according to the present invention. The relationship curve in FIG. 9 is plotted based on the actually measured data of high/low torques shown in FIGS. 8A-8E. When using the power impact and the oil-pulse torque tools, control parameters, such as the same voltage and the same tightening duration, can be preset for the same one tool. In this manner, when the tool operates with a stable current that is under monitoring and controlling throughout the whole tightening process, the same torque can be stably output when the workpieces to be tightened are the same in hardness. For this purpose, a highest current $I_H$ and a lowest current $I_L$ of the tool in normal operation at the existing output capacity are first detected. Then, the tool and a torque sensing device thereof are driven to calibrate the highest torque $T_H$ and the lowest torque $T_L$ that are correspondingly produced at the highest current and the lowest current, respectively. Thereafter, use the linear regression to establish a relationship curve of current and torque $L_S'$. Accordingly, when entering a target torque value falling between the highest and the lowest torque of the tool that are obtained from the above calibration, the microprocessor of the torque control device according to the present invention for the power torque tool instantly computes based on the correspondence relationship between current and torque stored in the memory unit and automatically adjusts the tool to a corresponding working current for driving the tool to perform the tightening operation. Throughout the whole tightening process, the working voltage and current are under monitoring and controlling to maintain stable current for performing the tightening operation. When the target torque value is reached, power supply to the tool is cut off and the power impact torque tool stops operating. In this manner, the output torque of the tool can be controlled and kept within a preset allowable range. After the tightening operation, if a relatively big difference exists between the torque value obtained from the calibration and the target torque value $T_X$, the actual torque value can be adjusted to a value closest to the range of the target torque value using the same method that is previously described with reference to FIGS. 7A-7B.

Please refer to FIG. 10, which is a block diagram of another embodiment of the torque control system for power impact torque tool according to the present invention, in which torque is controlled via current. This embodiment is different from the embodiments shown in FIGS. 6A-6B in that the torque control device $21d''$, $21d'''$, $21a''$, $21a'''$ includes a current control module 212', which replaces the voltage control module 212 in other embodiments. It has been proven the torque control system of the present invention with the current control module 212' can still achieve the same good torque control effect. However, when taking some factors into consideration, including the technical difficulty and the implementing cost, the use of voltage in torque control shall still be users' first choice.

The precision in tool structure, manufacturing and assembling has not an absolute influence on torque control. Generally, the adjustment of current amount flowing through the tool and the control of duration of impact time or other simple ways of voltage control all fail to obtain satisfactory effect in torque control. Particularly, due to unstable pulse signal generation, it is uneasy to detect the output torque of a power impact or an oil-pulse torque tool even if the tool has a torque sensing device mounted thereon. And, what makes the torque control more difficult is that all kinds of workpieces to be tightened and tightening elements to be used in the tightening operation involve many joining-related problems, including their materials, hardness and surface roughness, the treatment of screw-connection surfaces between them, the material of packing used between the workpieces and the tightening elements, the structure of joint surface, and the bolt tightening sequence; and the influence of all these problems on the precise control of the final tightening torque or clamping force is much greater than the influence from the tool's manufacturing quality or manufacturing precision.

The torque control system and method according to the present invention break through a misconception among manufacturers of conventional power impact torque tools that it is difficult to control the torque of this type of tools. The torque control system and method according to the present invention are provided based on a thorough understanding of the characteristics of relationship between the pulse signal and the torque of the power impact or the oil-pulse torque tool. The present invention has properly grasped the technique of capturing pulse signals to remove possible interferences during electric signal transmission. In the torque control system and method for power impact torque tool according to the present invention, before starting a tightening operation, a torque calibration based on the characteristics of the workpieces and the tightening elements to be used in the tightening operation is performed. In the calibration, the torque control device is used to detect the highest and the lowest working voltage or working current of the tool in normal operate, so as to establish a kinetic relationship curve of the highest/lowest working voltages or currents and the corresponding highest/lowest tightening torque values. Then, a target torque value falling between the highest and the lowest torque value can be input and the microprocessor of the torque control device can find the exact working voltage/current from the previously established relationship curve of working voltage/current and corresponding tightening torque value for driving the tool to produce the target torque value. Then, the microprocessor automatically adjusts the working voltage/current and displays the adjusted working voltage/current in the display unit, allowing the operator to perform the tightening operation with controllable output torque. Further, with the present invention, changes in the voltage/current are monitored and controlled according to preset conditions of operation and control during the whole tightening process to thereby achieve the purpose of precise torque control.

A precise torque control can be achieved for any power impact torque tool, provided the technical features and means defined by the torque control method and the torque control system of the present invention are exactly utilized. As emphasized by the torque control method and system of the present invention, throughout the whole tightening process, a stable working voltage/current is always maintained for driving the tool. Further, based on the relationship curve of the highest/lowest voltage or current of the tool in normal operation and the corresponding highest/lowest tightening torque values that is established through torque calibration before the tightening operation, the operator can input a desired target torque value that falls between the corresponding highest and lowest torque values to obtain a corresponding working voltage or working current for driving the power impact torque tool and the torque sensing device built in or externally connected to the output end of the tool to perform the tightening operation. During the tightening process, the microprocessor of the torque control device will remind the operator of the corresponding working voltage or working current. Then, the voltage or current can be manually or automatically adjusted to the correct working voltage/current for driving the tool to perform the tightening operation. The precision of the tightening torque control can be adjusted according to actually required precision degree by adjusting the allowable range of variation of working voltage or working current. The present invention also allows the user to modify the above-mentioned relationship curve of voltage/current and torque according to the actual torque value measured in the calibration, so as to perform the tightening operation with even more precise torque control.

The present invention has been described with some preferred embodiments thereof and it is understood that the preferred embodiments are only illustrative and not intended to limit the present invention in any way. Since the tightening torque of the power torque wrench is indirect proportion to the working voltage/current, the output torque can be controlled within a specific target range so long as the working voltage or current can be stably controlled within an allowable range of variation throughout the whole tightening process. Therefore, while the torque control method according to the present invention is described mainly from the aspect of voltage control, it is understood the description is only illustrative and not restrictive, and many changes and modifications in the described embodiments can be carried out without departing from the scope and the spirit of the invention that is intended to be limited only by the appended claims.

What is claimed is:

1. A torque control method for a power impact torque tool, to be applied to a tightening operation performed using the power impact torque tool or an oil-pulse torque tool, comprising the following steps:

connecting a power supply module to a torque control device built in or externally connected to an input end of the power impact torque tool to output a working voltage for driving the power impact torque tool and a torque sensing device built in or externally connected to an output end of the power torque tool; driving the power impact torque tool and the torque sensing device using a highest working voltage and a lowest working voltage of the power impact torque tool in normal operation, so as to perform a tightening torque calibration operation before the tightening operation starts; establishing a correspondence relationship between voltage and torque using the highest working voltage, the lowest working voltage, a corresponding highest torque value and a corresponding lowest torque value obtained from the tightening torque calibration operation; based on the correspondence relationship between voltage and torque, inputting a target torque value that falls between the corresponding highest torque value and the corresponding lowest torque value to obtain a first corresponding working voltage; using the first corresponding working voltage to drive the power impact torque tool and the torque sensing device to perform the tightening operation; and during the tightening operation, using a microprocessor of the torque control device to amplify and compute sensing signals instantly and continuously sent by the torque sensing device to the torque control device to obtain amplified and computed sensing signals and compare the amplified and computed sensing signals with a kinetic relationship curve pre-stored in a memory unit of the torque control device, so as to obtain a second corresponding working voltage for performing the tightening operation under closed-loop torque control; based on changes in voltage, current and temperature instantly and continuously detected by a voltage/current sensing element and a temperature sensing element of the torque control device, the microprocessor controls, via a voltage control module, the working voltage within a preset allowable range of variation for tightening torque control; and finally, cutting off the power supply module and emitting a warning when the target torque value is reached.

2. The torque control method for the power impact torque tool as claimed in claim 1, further comprising the following steps of pushing a torque modification key when a difference exists between an actual torque value and the target torque value; the microprocessor automatically adjusting the correspondence relationship between voltage and torque based on a modified torque value and displaying an adjusted controllable range of torque; inputting the target torque value again to obtain, based on an adjusted relationship of torque and working voltage, an adjusted working voltage that is corresponding to the target torque value; and using the adjusted working voltage to drive the power impact torque tool for performing the tightening operation so that a produced torque reaches the target torque value.

* * * * *